United States Patent  (10) Patent No.: US 7,386,498 B1
Miyazaki et al. (45) Date of Patent: Jun. 10, 2008

(54) TRANSACTION ASSISTING APPARATUS AND RECORDING MEDIUM

(75) Inventors: Kiyoshi Miyazaki, Kawasaki (JP); Atsuko Okajima, Kawasaki (JP); Shigehiko Terashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/502,825

(22) Filed: Feb. 11, 2000

(30) Foreign Application Priority Data

Mar. 3, 1999 (JP) .................................. 11-054858
Oct. 25, 1999 (JP) .................................. 11-302603

(51) Int. Cl.
*G06Q 00/40* (2006.01)
(52) U.S. Cl. ................................ 705/37; 39/35; 273/256
(58) Field of Classification Search ................ 705/28, 705/37, 5, 26, 10, 35, 27, 36, 39; 345/835; 235/380; 273/256; 364/401
See application file for complete search history.

(56) References Cited

U.S. PATENT DOCUMENTS

| 3,581,072 | A | * | 5/1971 | Nymeyer ....................... 705/37 |
| 4,382,602 | A | * | 5/1983 | Cusick et al. ............... 273/256 |
| 5,168,445 | A | | 12/1992 | Kawashima et al. |
| 5,297,031 | A | * | 3/1994 | Gutterman et al. .......... 705/37 |
| 5,655,088 | A | | 8/1997 | Midorikawa et al. |
| 5,687,323 | A | | 11/1997 | Hodroff |
| 5,787,402 | A | * | 7/1998 | Potter et al. ................... 705/37 |
| 5,794,207 | A | * | 8/1998 | Walker et al. .................. 705/1 |
| 5,870,722 | A | * | 2/1999 | Albert et al. ................. 705/39 |
| 5,905,974 | A | * | 5/1999 | Fraser et al. ................. 705/37 |

(Continued)

FOREIGN PATENT DOCUMENTS

EP 0 401 203 A2 12/1990

(Continued)

OTHER PUBLICATIONS

PR Newswire, "5th Market to Establish New ECN for Derivatives Trading in Early 2000; 5th Market Announces Completion of Equity Financing", New York: Aug. 27, 1999. p. 1 [ProQuest document ID: 44248619 and Document URL: http://proquest.umi.com/pqdweb?did=4.*

(Continued)

*Primary Examiner*—Harish T. Dass
(74) *Attorney, Agent, or Firm*—Staas & Halsey LLP

(57) ABSTRACT

A transaction assisting apparatus capable of automatically transacting chain orders. Chain order input unit accepts entry of a chain order and supplies the input chain order to chain order storing unit to be stored therein. Order detecting unit is supplied with an input buy order, and if the buy order placed is for the chain order, it notifies chain order processing unit that the buy order has been placed for the chain order. The chain order processing unit performs a selling/purchasing process with respect to the chain order for which the buy order has been placed. When the selling/purchasing process is completed, deleting unit deletes the corresponding chain order from the chain order storing unit. In the event the price of chained goods has changed, price changing unit changes the price of chain goods correspondingly in an interlocked manner. Display unit selectively displays, on display units, only those chain orders which satisfy certain conditions such as the presence of chained goods.

18 Claims, 23 Drawing Sheets

U.S. PATENT DOCUMENTS

| | | | | |
|---|---|---|---|---|
| 5,924,082 A * | 7/1999 | Silverman et al. | ............. | 705/37 |
| 5,970,479 A * | 10/1999 | Shepherd | ..................... | 705/37 |
| 6,012,046 A * | 1/2000 | Lupien et al. | ............. | 705/36 R |
| 6,014,643 A * | 1/2000 | Minton | ........................ | 705/37 |
| 6,058,379 A * | 5/2000 | Odom et al. | ................... | 705/37 |
| 6,112,189 A * | 8/2000 | Rickard et al. | ................ | 705/37 |
| 6,134,535 A * | 10/2000 | Belzberg | ..................... | 705/37 |
| 6,260,024 B1 * | 7/2001 | Shkedy | ........................ | 705/37 |
| 6,421,653 B1 * | 7/2002 | May | ............................ | 705/37 |
| 2002/0032643 A1 * | 3/2002 | Himmelstein | ................ | 705/37 |

FOREIGN PATENT DOCUMENTS

| | | |
|---|---|---|
| JP | 07-319964 A | 5/1994 |
| JP | 10-500788 A | 3/1995 |
| JP | 10/011497 A | 6/1996 |
| WO | 96/41293 | 12/1996 |
| WO | WO 96/41293 | 12/1996 |
| WO | WO 98/28900 | 7/1998 |

OTHER PUBLICATIONS

"Dictionary of Finance and Investment Terms, Fifth Edition (Barron's Financial Guides)"—3 pages, 1998.*

Dian Hymer "Starting Out The Complete Home Buyer's Guide", Chronicle Books, San Francisco, 1997.*

CyBerCorp "Trader's Workstation an Integrated Trading Environment version 1.7" dated Oct. 1998 (35 pages).*

"KPMG Seminar Brings Clarity to FASB 133", PR Newwire, Date: Oct. 1, 1998; More resuts for: FASB 133 1998 hedge publication. 2 pages.*

Foreign Currency Hedges: Hedging Foreign-Currency Denominated Interest Payments, "Derivatives Implemantation Group" Statement 133 Implementation Issue No. H4; Paragraph references: 21, 29, 37, 40, 540; Date cleared by Board; Jul. 28, 1999 3 pages.*

Larsen et al. Hedgin foreign Currency Transaction Exposure: the Inportance of Real Rates of Interest, Journal of financial and Strategic Decisions; vol. 9 No. 1; Spring 1996 1 page.*

Asim Ghosh, "Cross-hedging foreign currency risk; Empirical evidence from an erroe correction model" Review of Quantitative Finance and Accounting, Springer Netherlands, ISSN: 0924-865X (Print) 1573-7179 (Online); Department of Finance, Saint Joseph's University, 19131 Philadelphia, PA, USA 1 page.*

Japanese Office Action issued on Nov. 14, 2006 in corresponding Japanese Patent Application No. 11-302603.

* cited by examiner

| HOOK ISSUE | AMOUNT | RATE | DESIGNATION RANGE | HOOKED ISSUE |
|---|---|---|---|---|
| 183 | 1 BILLION | +0.1 | 1.00~1.20 | 200 |

FIG. 2

SELL 183 BUY

| ORDER NO. | RATE | AMOUNT | ORDER NO. | RATE | AMOUNT |
|---|---|---|---|---|---|
| (8) H | 1.150 | 1 BILLION | | | |
| | | | | | |
| | | | | | |

SELL 200 BUY

| ORDER NO. | RATE | AMOUNT | ORDER NO. | RATE | AMOUNT |
|---|---|---|---|---|---|
| (2) | 1.050 | 1 BILLION | | | |
| | | | | | |
| | | | | | |

FIG. 3

SELL 183 BUY

| ORDER NO. | RATE | AMOUNT | ORDER NO. | RATE | AMOUNT |
|---|---|---|---|---|---|
| (12) H | 1.155 | 1 BILLION | | | |
| | | | | | |
| | | | | | |

SELL 200 BUY

| ORDER NO. | RATE | AMOUNT | ORDER NO. | RATE | AMOUNT |
|---|---|---|---|---|---|
| (10) | 1.055 | 1 BILLION | | | |
| (2) | 1.050 | 1 BILLION | | | |
| | | | | | |

FIG. 4

| | | |
|---|---|---|
| ORDER NO. | 010004 | |
| BODY NO. | 554845 | |
| MODEL YEAR | `90 | |
| COLOR | RED | |
| DISTANCE | 100,000KM | |
| FIRST REGISTRATION DATE | 1997/10/14 | |
| LAST REGISTRATION DATE | 1997/10/14 | |
| LAST REGISTRATION NO. | SHINAGAWA33RI1234 | |
| PRICE DESIRED | 600,000YEN | |
| DEAL | REPLACEMENT | |
| | PRIORITY | BUY |
| | MODEL YEAR | `89 |
| | BODY NO. | 111845 |
| | COLOR | WHITE |
| | DISTANCE | 80,000KM |
| | PRICE | 900,000YEN |
| BANK NO. | 0002 | |
| BRANCH NO. | 101 | |
| DEPOSIT NO. | 0 | |
| ACCOUNT NO. | 0123456789 | |
| TRANSFER TYPE | TELEGRAPHIC | |
| ACCOUNT HOLDER'S NAME | TATSURO FUJIKAWA | |
| ACCOUNT HOLDER'S ADDRESS | OTEMACHI 1-1,CHIYODA-KU,TOKYO | |
| ZIP CODE | 100-0101 | |
| ACCOUNT HOLDER'S PHONE NO. | 03-1234-5678 | |

FIG. 14

| | |
|---|---|
| ORDER NO. | 010004 |
| BODY NO. | 554845 |
| MODEL YEAR | `90 |
| COLOR | RED |
| DISTANCE | 100,000KM |
| FIRST REGISTRATION DATE | 1997/10/14 |
| LAST REGISTRATION DATE | 1997/10/14 |
| LAST REGISTRATION NO. | SHINAGAWA33RI1234 |
| PRICE DESIRED | 600,000YEN |
| DEAL | REPLACEMENT |
| | PRIORITY | BUY |
| | BODY NO. | 111845 |
| | MODEL YEAR | `89 |
| | COLOR | WHITE |
| | DISTANCE | 80,000KM |
| | PRICE | 900,000YEN |
| CARD NO. | 3415-1414-1234-1234 |
| TERM OF VALIDITY | 2002/05/01 |
| PAYMENT TYPE | LUMP-SUM PAYMENT BY BONUS |
| CARDHOLDER'S NAME | TATSURO FUJIKAWA |
| CARDHOLDER'S ADDRESS | OTEMACHI 1-1,CHIYODA-KU,TOKYO |
| PERSONAL ID NO. | 0123 |
| STATUS OF APPROVAL | OK |
| ZIP CODE | 100-0101 |
| ACCOUNT HOLDER'S PHONE NO. | 03-1234-5678 |

FIG. 15

| ORDER NO. | BODY NO. | MODEL YEAR | COLOR | DISTANCE | SELL /BUY | PRICE | AGENCY |
|---|---|---|---|---|---|---|---|
| 010001 | 198571 | 95 | BLACK | 12,000 | SELL | 950,000 | ○× MOTORS |
| 010002 | 241589 | 97 | WHITE | 50,000 | BUY | 600,000 | ×△ MOTORS |
| 010003 | 989845 | 89 | RED | 89,000 | SELL | 380,000 | △△ SALES |
| 010004 | 111845 | 89 | WHITE | 80,000 | BUY | 900,000 | ×× MOTORS |

FIG. 16

| ORDER NO. | BODY NO. | MODEL YEAR | COLOR | DISTANCE | SELL /BUY | PRICE | AGENCY |
|---|---|---|---|---|---|---|---|
| 010001 | 198571 | 95 | BLACK | 12,000 | SELL | 950,000 | ○× MOTORS |
| 010002 | 241589 | 97 | WHITE | 50,000 | BUY | 600,000 | ×△ MOTORS |
| 010003 | 989845 | 89 | RED | 89,000 | SELL | 380,000 | △△ SALES |
| 010004 | 554845 | 90 | RED | 100,000 | SELL | 600,000 | ×× MOTORS |

FIG. 20

SELL 183 BUY

| ORDER NO. | RATE | AMOUNT | ORDER NO. | RATE | AMOUNT |
|---|---|---|---|---|---|
| (1) | 1.065 | 1 BILLION | | | |
| | | | | | |
| | | | | | |

FIG. 23
PRIOR ART

TRANSACTION ASSISTING APPARATUS AND RECORDING MEDIUM

BACKGROUND OF THE INVENTION (1) Field of the Invention

The present invention relates to a transaction assisting apparatus and a recording medium, and more particularly, to a transaction assisting apparatus for assisting transactions wherein sell/buy orders from a plurality of customers are displayed at display units and when a deal for a certain order is offered, an agent places an order for corresponding goods to thereby conduct the deal of goods, and to a computer-readable recording medium storing a program for causing a computer to perform such a transaction assisting process.

(2) Description of the Related Art

In recent years, a variety of transaction assisting apparatus are used with a view to ensuring reliability and swiftness of transactions in goods etc.

FIG. 22 is a block diagram exemplifying a configuration of a transaction assisting system comprising a transaction assisting apparatus for assisting transactions in bonds, terminal units, etc.

In the figure, a transaction assisting apparatus 1 accepts and stores sell and buy orders etc. for bonds, which are input from a terminal unit 2 owned by an agent, performs a predetermined process on the orders, and makes the orders displayed at the terminal unit 2 as well as at display units 3-1 to 3-n installed at customers' side.

A telephone 4 installed at the agent's side is connected via a leased line (hot line) 6 to customers' telephones 5-1 to 5-n.

Let it be assumed that, in this transaction assisting system, a customer A, for example, has requested, using the telephone 5-1, a sell order for bonds with the circular issue (a sort of serial number) "183" to the agent having the telephone 4.

On receiving the request, the agent operates the terminal unit 2 to input the sell order for "183". The transaction assisting apparatus 1 detects the input of the sell order for the bonds "183", stores the input sell order in a storage device therein, and displays the sell order at the agent's terminal unit 2 as well as at the display units 3-1 to 3-n.

FIG. 23 shows an example of a screen displayed in this case at the terminal unit 2 and the display units 3-1 to 3-n. In the illustrated example, sell and buy orders for the bonds "183" are shown in list form. Also, in the screen shown in the figure, sell orders and buy orders are shown in left- and right-hand regions of the list, respectively. "ORDER NO." is a number assigned so as to specify each sell or buy order, and "RATE" indicates the yield of the bond concerned. "AMOUNT" indicates an amount ordered, and "1 BILLION" means one billion yen. The display screen as shown in the figure is called board screen.

In the illustrated example, only one order is shown, but in cases where there are a plurality of orders, sell orders and buy orders are respectively shown in order of rate such that the order with the highest rate (hereinafter referred to as best rate) is listed at top.

If, looking at the display screen, a customer B, for example, puts in a buy order for "183" with the agent by using the telephone 5-2, the agent enters the requested buy order through the terminal unit 2. Consequently, the transaction assisting apparatus 1 performs a contracting process (process executed when a deal is to be closed) with respect to the sell order for "183".

As a result, the deal for "183" is conducted, whereupon the transaction assisting apparatus 1 deletes the sell order for "183" from the storage device and also deletes the display item corresponding to the sell order for "183" from the display screens of the terminal unit 2 and the display units 3-1 to 3-n. If there are other sell orders remaining, display items corresponding thereto are appropriately rearranged according to rates.

The use of the aforementioned transaction assisting apparatus 1 permits reliable and speedy transactions.

In the dealing business, a so-called chain deal is conducted in which one purchases somebody else's goods on condition that he or she sells his/her own goods.

In the case of bonds, for example, chain deal is conducted in such a manner that one purchases somebody else's "200" bonds if a buy order is offered for his/her "183" bonds, or conversely, one sells his/her "183" bonds if a sell order for "200" bonds is offered by somebody else.

Let us consider the case where such chain deal is conducted with the use of the transaction assisting system shown in FIG. 22. If a customer puts in the chain order as mentioned above, for example, the agent enters a sell order for "183" through the terminal unit 2, whereupon the sell order for "183" is displayed at the terminal unit 2 and the display units 3-1 to 3-n.

This chain order is a sell order premised on the presence of a chained order (in this example, "200") on which the chain order chains, and accordingly, the agent must always make sure whether there is a sell order for "200", which is a chained order, and must immediately suspend the sell order for "183" when there is no chained order present.

Thus, when such a chain order is accepted, it is necessary for the agent to always direct his or her attention to chained orders, making the work complicated.

Also, when a buy order is offered for the chain order "183", a buy order for the chained order "200" must be placed immediately in a manner interlocked with such a buy order, which increases the burden imposed on the agent.

Further, in cases where chain orders are chained (for example, the above order for "200" also is a chain order which chains on "201"), the aforementioned operation needs to be repeatedly performed, which often makes it difficult to carry out the process reliably and speedily.

In the transactions in used cars, real estate, etc., so-called replacement deal is a customary practice wherein one purchases somebody else's goods or real estate on condition that a buy order is offered for his or her goods or real estate, or conversely, one sells his/her goods or real estate on condition that a sell order for goods or real estate is offered by somebody else. Problems similar to those described above also arise in this kind of transactions.

Further, in the case of transactions in used cars, real estate, etc., a person who has to pay taxes changes from one to another at the time when the ownership and thus the title are transferred. Accordingly, if the previous owner has paid taxes extra, it is necessary that the overpayment be refunded and also that the deficit be collected from the current owner, thus requiring complicated procedures.

SUMMARY OF THE INVENTION

An object of the present invention is to provide a transaction assisting apparatus which makes it possible to reliably and speedily conduct chain orders and replacement orders in transactions in goods etc.

Another object of the present invention is to provide a transaction assisting apparatus which makes it possible to reliably and easily carry out tax-related procedures etc. that accompany the transfer of ownership of goods etc.

To achieve the above objects, there is provided a transaction assisting apparatus for assisting transactions in goods. The transaction assisting apparatus comprises chain order input means permitting input of a chain order, the chain order being an order requesting, on condition of sale or purchase of first goods, purchase or sale of second goods different from the first goods, order detecting means for detecting an order for purchase or sale of the first goods with respect to which the chain order is placed, and chain order processing means, responsive to the detection of a buy or sell order with respect to a predetermined chain order by the order detecting means, for performing a selling or purchasing process with respect to the first goods and performing a purchasing or selling process with respect to the second goods.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a diagram showing an example of information stored in chain order storing means appearing in FIG. 1;

FIG. 3 is a diagram showing an example of a display screen displayed at a display unit appearing in FIG. 1;

FIG. 4 is a diagram showing an example of a display screen which is displayed when a sell order for a chained issue is newly offered in FIG. 3;

FIG. 14 is a diagram showing an example of an order input from each terminal unit in the embodiment shown in FIG. 11;

FIG. 15 is a diagram showing another example of an order input from each terminal unit in the embodiment shown in FIG. 11;

FIG. 16 is a diagram showing an example of a screen displayed at each terminal unit in the embodiment shown in FIG. 11;

FIG. 20 is a diagram showing another example of a screen displayed at each terminal unit in the embodiment shown in FIG. 11;

FIG. 23 is a diagram showing an example of a display screen displayed at a terminal unit and display units of the system shown in FIG. 22.

DESCRIPTION OF THE PREFERRED EMBODIMENTS

Embodiments of the present invention will be hereinafter described with reference to the drawings. It is to be noted that in the specification, "goods" represent "property which can be dealt in" and include not only "movable property" but "fixed property" and "intangible property" and that in the claims, "chain order" includes "replacement order."

Figure 1:
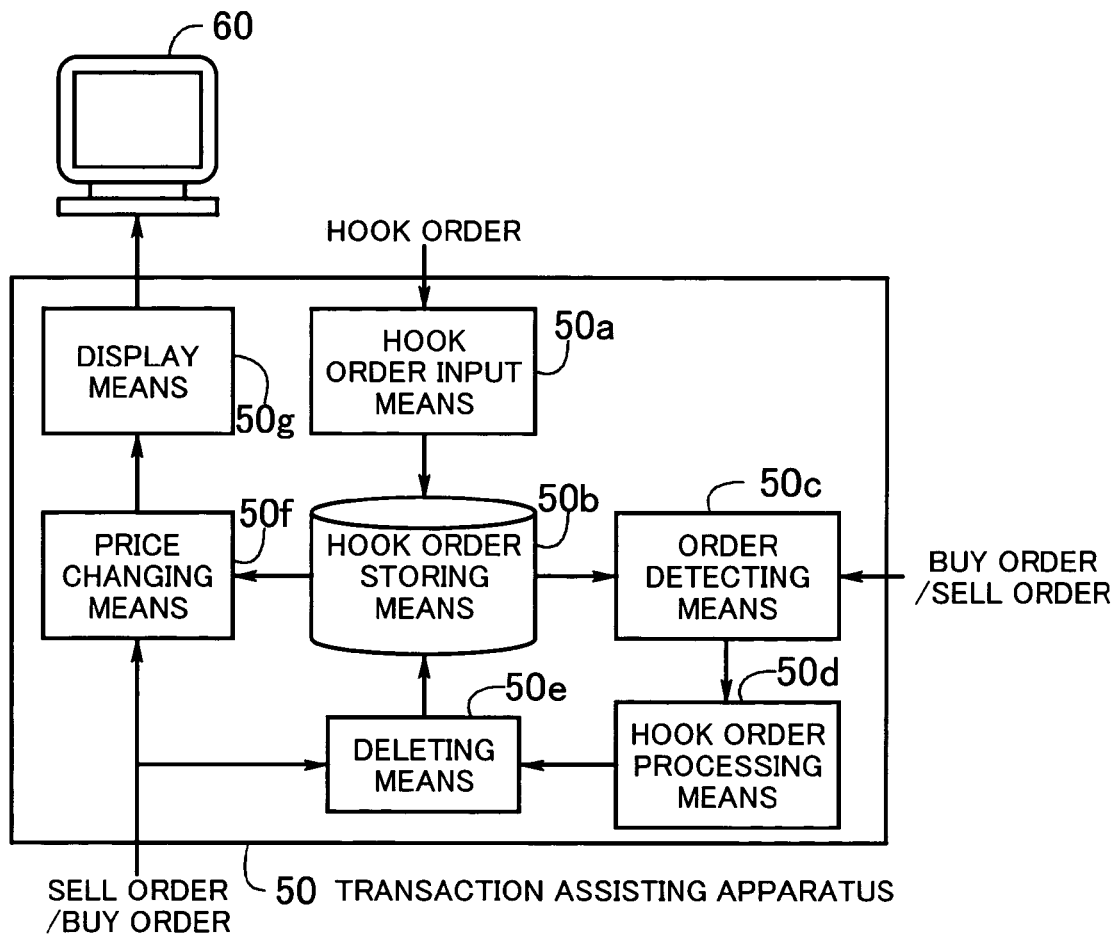
FIG. 1 is a diagram illustrating the principle of operation according to the present invention.

FIG. 1 illustrates the principle of operation of a transaction assisting apparatus according to the present invention.

In the figure, chain order input means $50a$ permits input of a chain order, which is an order requesting, on condition of sale or purchase of first goods, purchase or sale of second goods different from the first goods.

Chain order storing means $50b$ stores the chain order input from the chain order input means $50a$. The chain order storing means $50b$ stores, in addition to chain orders, ordinary sell orders and buy orders.

Order detecting means $50c$ detects a buy or sell order for the first goods which are a target of a predetermined chain order stored in the chain order storing means $50b$.

When such a buy or sell order with respect to the predetermined chain order is detected by the order detecting means $50c$, chain order processing means $50d$ performs a selling or purchasing process with respect to the first goods and a purchasing or selling process with respect to the second goods.

Deleting means $50e$ deletes, from the chain order storing means $50b$, a chain order with respect to which processing has been completed by the chain order processing means $50d$.

If the price of the second goods has changed because of a new sell or buy order etc., price changing means $50f$ changes the price of the first goods in a manner interlocked with the change of the price of the second goods. When it is unnecessary to change prices, the price changing means $50f$ supplies the chain orders stored in the chain order storing means $50b$ directly to display means $50g$.

The display means $50g$ causes a display unit 60 to display the chain order of which the price has been appropriately changed by the price changing means $50f$.

The operation in accordance with the aforementioned principle will be now described. The following description is given taking as an example a chain deal in which one purchases somebody else's goods on condition of sale of his or her goods.

Assuming that a customer A places a chain order for purchase of bonds "200" on condition of sale of his/her bonds "183", the chain order is entered by, for example, an agent, through the chain order input means $50a$. In the following, the bonds (in this example, "183") which are to be sold by the chain order are called chain issue, and the bonds (in the example, "200") to be purchased are called chained issue.

The chain order input from the chain order input means $50a$ is stored in the chain order storing means $50b$.

FIG. 2 shows, by way of example, a chain order stored in the chain order storing means $50b$. In the illustrated example is shown information indicative of a chain order specifying the aforementioned "200" as the chained issue (on which the chain issue chains) and "183" as the chain issue. "AMOUNT" indicates an amount of the chain issue to be sold and, in this example, "1 BILLION" yen.

"RATE" is a value determining the selling rate of "183", and the illustrated example indicates that "0.1" is to be added to the rate of the chained issue "200". Accordingly, if the rate of "200" is "1.05", the rate of "183" is "1.15".

"DESIGNATION RANGE" indicates that if the best rate of the chained issue is within this range, the corresponding chain order is valid. In the illustrated example, if a buy order for the chain issue "183" is offered and if the best rate of the chained issue "200" is within the range from "1.00" to "1.20", a buy order is placed for the chained issue "200".

The price changing means 50f reads out the chain order stored in the chain order storing means 50b, and if the price of the chained issue has changed, it changes the price of the chain issue and supplies the changed price to the display means 50g. If there has been no change in price, the information is supplied to the display means 50g without being modified.

The display means 50g causes the display unit 60 to display the information supplied from the price changing means 50f. In this case, the display means 50g assigns an order number to each order, and also affixes information indicative of chain order (as described in detail later) to an order if the order is a chain order.

FIG. 3 shows an example of a display screen displayed at the display unit 60 as a result of the aforementioned process. In the illustrated example is shown information relating to "183" and "200". With regard to "183", the information corresponding to the previously input chain order is shown with the order number "8" assigned thereto. "H" appearing in the lower right corner of the cell with the order number "8" indicates that the order concerned is a chain order, and is information affixed by the display means 50g. In "RATE" is shown a value (=1.150) which is obtained by adding "0.1" to the rate of the sell order with the order number "2" displayed as the information relating to "200" below the information on "183".

Basically, chain order is a sell/buy order for chained goods, and thus the sell/buy order for other goods should also be displayed on the board screen. If, however, such a sell/buy order for other goods is displayed, a sell order, for example, can possibly be placed for the buy order, and therefore, such a sell/buy order is shown temporarily after the deal of the chain issue is transacted, and not at the time when the order is placed.

Let it be assumed that a customer B, for example, puts in a buy order for "183" while viewing the display screen as shown in FIG. 3, the order detecting means 50c makes reference to the chain order storing means 50b to determine whether there is a chain order which chains on the input buy order. If, as a result, it is found that there is an applicable chain order, the order detecting means 50c acquires the corresponding information from the chain order storing means 50b and supplies the acquired information to the chain order processing means 50d.

While referring to the chain order supplied from the order detecting means 50c, the chain order processing means 50d performs a selling process with respect to the chain issue and a purchasing process with respect to the chained issue.

In this example, "183" is the chain issue and "200" is the chained issue; accordingly, the selling process is performed with respect to "183" and then the purchasing process is performed with respect to "200". As a result, "183" is sold to the customer B and "200" is sold to the customer A who placed the chain order, whereby a contract is made.

After the processing of the chain order is completed, the chain order processing means 50d notifies the deleting means 50e of completion of the processing. On receiving such notification from the chain order processing means 50d, the deleting means 50e deletes the corresponding chain order from the chain order storing means 50b.

Consequently, the chain order shown in FIG. 2 is deleted from the chain order storing means 50b and the order with the order number "8", shown in FIG. 3, disappears from the screen of the display unit 60.

At this time, the display means 50g causes the display unit 60 to temporarily display a message informing that a buy order for the chain issue has been accepted.

Such a buy order for the chain issue may alternatively be displayed on the board screen while specifying that the order concerned is a buy order related to the chain order.

As described above, the transaction assisting apparatus 50 according to the present invention automatically conducts chain orders, whereby the burden imposed on the agent etc. can be mitigated.

In the foregoing description, fluctuation in price of the chained issue and other factors are not taken account of; however, in actual transactions, price is subject to fluctuation and also a sell order for the chained issue may be canceled. The following explains a process executed in such situations.

Let it be assumed that a sell order is newly put in for the chained issue "200", for example, and that the rate of this sell order is the highest (best rate) among those then available. Chain order should chain on the chained issue with the best rate, and therefore, if the best rate has changed, the rate of the chain issue needs to be varied so as to follow up such change.

Assuming that a new sell order with the rate "1.055" is placed for the chained issue "200", for example, this order is displayed at the top of the display area associated with "200", as shown in FIG. 4, since it has the best rate.

In this case, the price changing means 50f detects the change in the best rate of the chained issue, changes the rate of the chain issue "183", and supplies the changed rate to the display means 50g. Specifically, in this example, since the rate of the chain issue is the sum of the rate of the chained issue and "0.1", as shown in FIG. 2, "1.155" is calculated as the new rate and is supplied to the display means 50g.

The display means 50g generates a new order number "12" for the chain order whose rate has been changed, and updates the contents of information displayed at the display unit 60.

As a result, a chain order having the order number "12" and the rate "1.155" is displayed at the display unit 60, as shown in FIG. 4.

As described above, with the transaction assisting apparatus 50 according to the present invention, the rate of the chain issue is varied automatically in a manner interlocked with fluctuation in the rate of the chained issue, whereby the burden imposed on the agent etc. can be mitigated.

The following describes a process executed in cases where the best rate of the chained issue becomes outside the designation range, the chained issue is sold out, or the sell order has been canceled and there no longer exists a chained issue to be dealt in.

If the best rate of the chained issue changes to "1.21", for example, then it is outside the designation range because the chain order for the chain issue "183" has the designation range from "1.00" to "1.20", as shown in FIG. 2.

In such a case, the display means 50g immediately stops the output of this chain order, so that the corresponding information disappears from the screen of the display unit 60.

Similarly, in cases where a sell order for the chained issue has gone, the display of the chain order is stopped by the display means 50g, and thus the corresponding information disappears from the screen.

The display of the chain order is stopped only temporarily, and if the best rate of the chained issue comes to fall within the designation range or a new sell order is placed for the chained issue, the chain order is again displayed on screen.

As described above, with the transaction assisting apparatus 50 according to the present invention, in cases where a sell order for the chained issue has gone or the best rate of the chained issue becomes outside the designation range, the display of the chain order is temporarily stopped. It is therefore unnecessary for the agent to stop or restart the display of the chain order while watching the conditions for display, whereby the burden imposed on the agent can be mitigated.

In the case where an order for the chained issue also is a chain order, the chain order processing means 50d performs a similar process also with respect to the chained issue, so that a chain of chain orders can be coped with. If, in the example stated above, an order for the issue "200", on which "183" chains, is a chain order specifying "201" as the chained issue, for example, the purchasing process for "201" is additionally executed following the aforementioned process.

It is therefore possible to further mitigate the burden imposed on the agent and to carry out transactions reliably and speedily.

Figure 5:
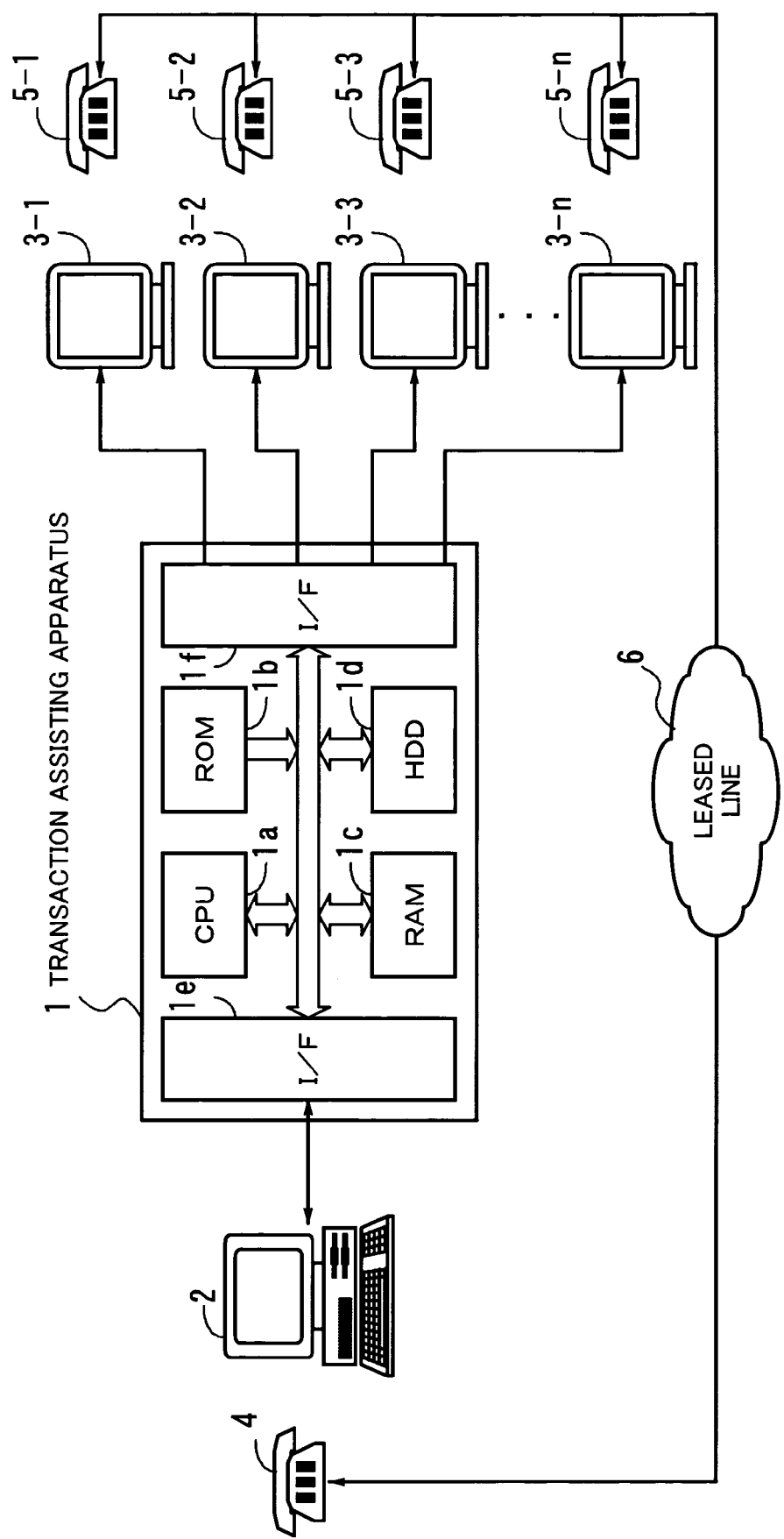
FIG. 5 is a block diagram exemplifying a configuration according to one embodiment of the present invention.

Referring now to FIG. 5, an exemplary configuration according to one embodiment of the present invention will be described.

FIG. 5 is a block diagram exemplifying a configuration according to the embodiment of the present invention.

In the figure, a transaction assisting apparatus 1 accepts and stores sell orders, buy orders, etc. input through a terminal unit 2 owned by an agent, subjects the input orders etc. to a predetermined process such as sorting, and causes the terminal unit 2 and display units 3-1 to 3-n installed at customers' side to display the processed data.

As shown in the figure, the transaction assisting apparatus 1 comprises a CPU (Central Processing Unit) 1a, a ROM (Read Only Memory) 1b, a RAM (Random Access Memory) 1c, an HDD (Hard Disk Drive) 1d, I/Fs (Interfaces) 1e and 1f, and a bus 1g.

The CPU 1a controls various sections of the apparatus in accordance with programs etc. stored in the ROM 1b, the RAM 1c and the HDD 1d, and performs various operations.

The ROM 1b stores basic programs executed by the CPU 1a, as well as data, etc.

The RAM 1c temporarily stores programs to be executed by the CPU 1a, data derived in the middle of calculations, etc.

The HDD 1d stores various programs executed by the CPU 1a, and also stores sell orders, buy orders, chain orders, etc. input through the terminal unit 2.

The I/F 1e is an interface for the terminal unit 2, and converts data format from one to another to permit exchange of information between the terminal unit 2 and the transaction assisting apparatus 1.

The I/F 1f supplies image information simultaneously to the display units 3-1 to 3-n and causes the display units to display a board screen as shown in FIG. 23. The contents of display of the terminal unit 2 are the same as those of the display units 3-1 to 3-n, and thus the agent and the customers share identical information.

The bus 1g interconnects the CPU 1a, the ROM 1b, the RAM 1c, the HDD 1d, and the I/Fs 1e and 1f, to permit information to be exchanged with one another.

A telephone 4 installed at the agent's side is connected via a leased line (hot line) 6 to telephones 5-1 to 5-n installed at the customers' side.

The operation of the above embodiment will be now described with reference to FIG. 6.

Figure 6:
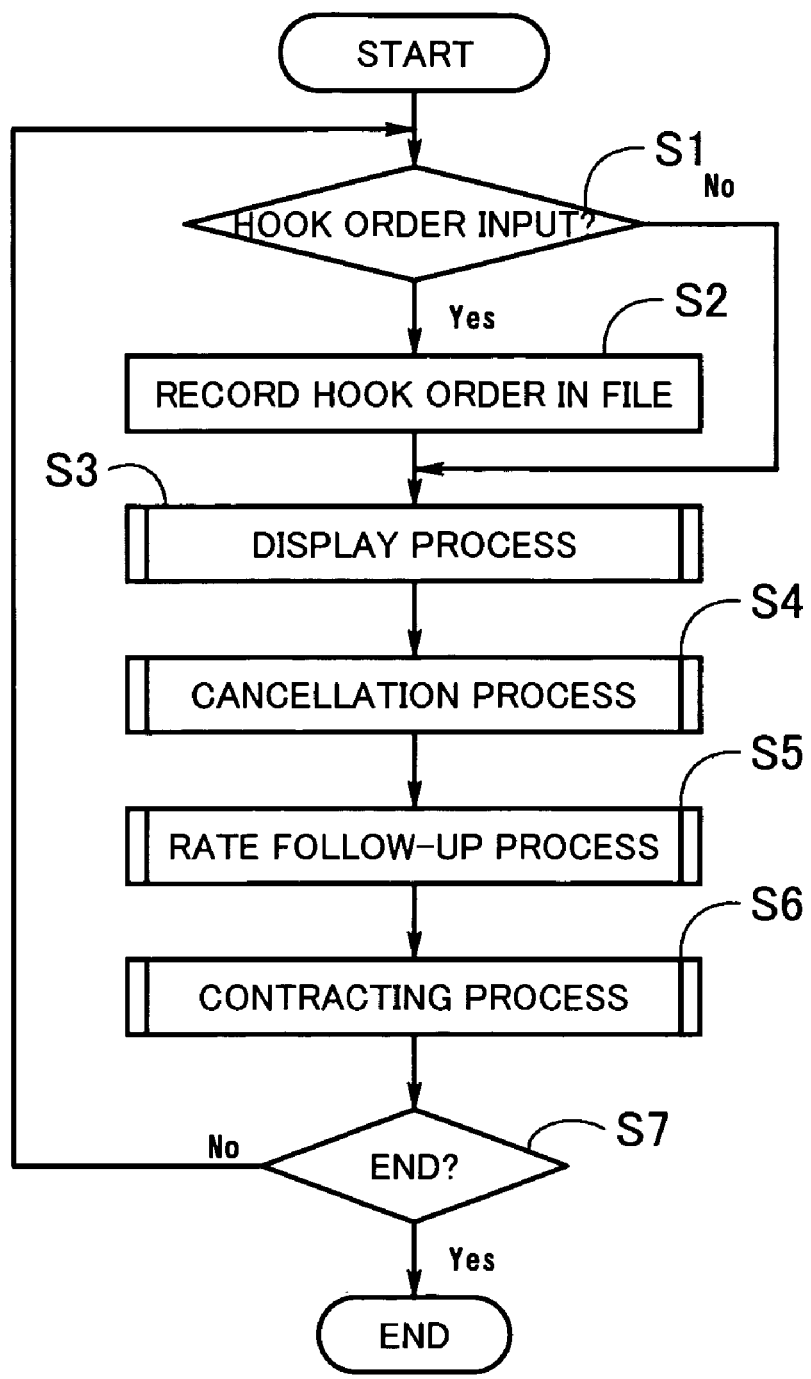
FIG. 6 is a flowchart showing an example of a process executed in the embodiment shown in FIG. 5.

FIG. 6 is a flowchart illustrating an example of a process executed when a chain order is placed in the embodiment shown in FIG. 5. When the process is started, the following steps are executed.

[S1] The CPU 1a determines whether or not a chain order has been put in. If a chain order has been put in, the flow proceeds to Step S2; otherwise the flow proceeds to Step S3.

Namely, when a chain order has been input through manipulation of the terminal unit 2, the CPU 1a executes Step S2; otherwise it executes Step S3.

[S2] The CPU 1a records the chain order input in Step S1 in a predetermined file (reserved order file; see FIG. 2) stored in the HDD 1d.

[S3] The CPU 1a performs, with respect to the terminal unit 2 and the display units 3-1 to 3-n, a "DISPLAY PROCESS" whereby the chain orders stored in the reserved order file shown in FIG. 2 are suitably displayed at these units.

Details of the process will be described later with reference to FIG. 7.

[S4] If a certain chain order fails to fulfill required conditions, the CPU 1a executes a "CANCELLATION PROCESS" whereby the chain order concerned is canceled.

Details of this process will be described later with reference to FIG. 8.

[S5] If the best rate of the chained issue has changed, the CPU 1a executes a "RATE FOLLOW-UP PROCESS" to cause the rate of the chain issue to follow up the best rate in a manner interlocked therewith.

The process will be described in detail later with reference to FIG. 9.

[S6] If a buy order is put in for the chain issue with respect to which a chain order has been placed, the CPU 1a executes a "CONTRACTING PROCESS", which is a series of operations required to transact the chain order.

Figure 10:
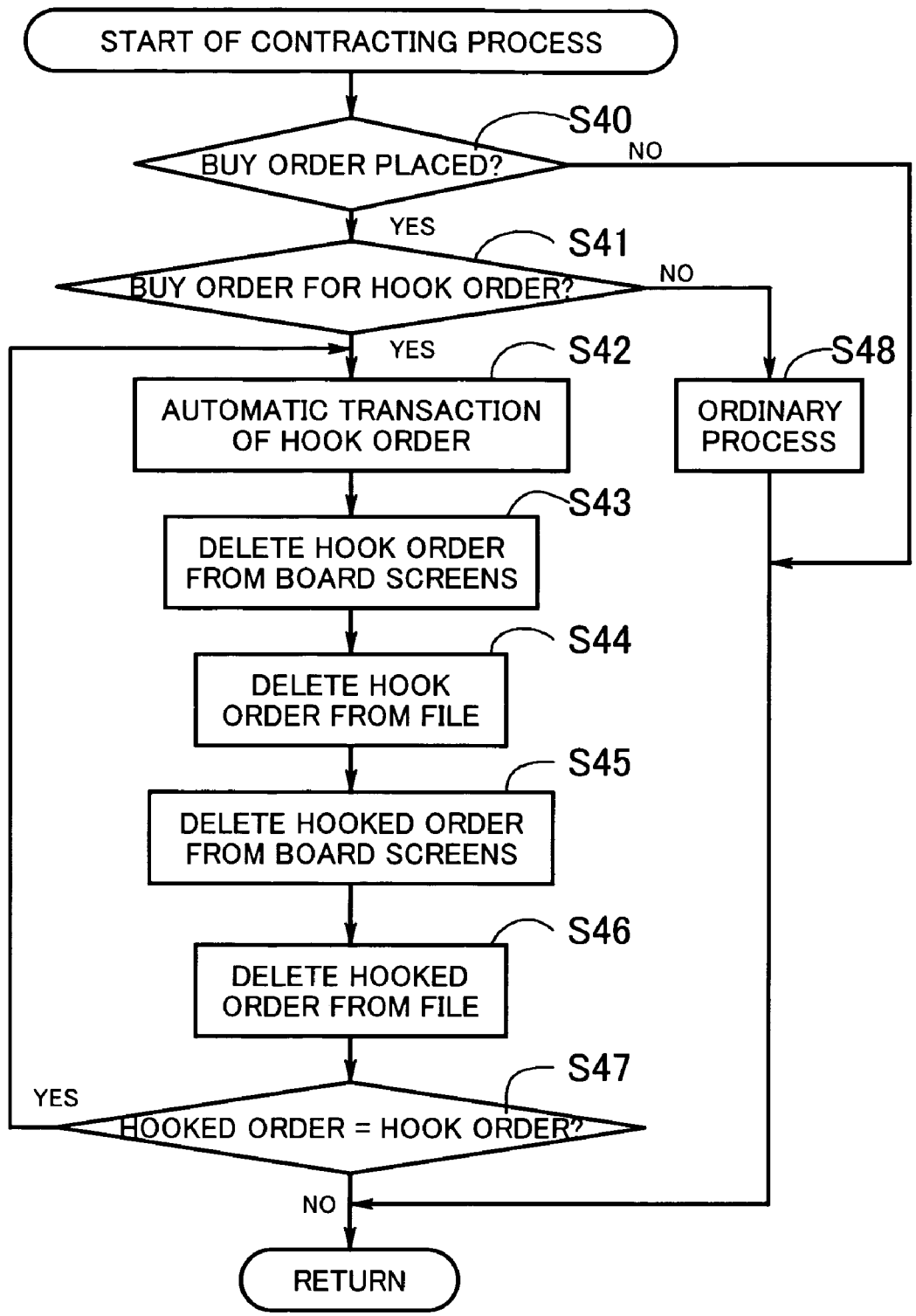
FIG. 10 is a flowchart illustrating details of a "CONTRACTING PROCESS" shown in FIG. 6.

Details of this process will be described later with reference to FIG. 10.

[S7] The CPU 1a determines whether or not the process is to be ended. If the process should not be ended, the flow returns to Step S1, otherwise the process is ended (END).

For example, if execution of a process other than the illustrated process is requested, the CPU 1a terminates the process; otherwise the flow returns to Step S1.

Figure 7:
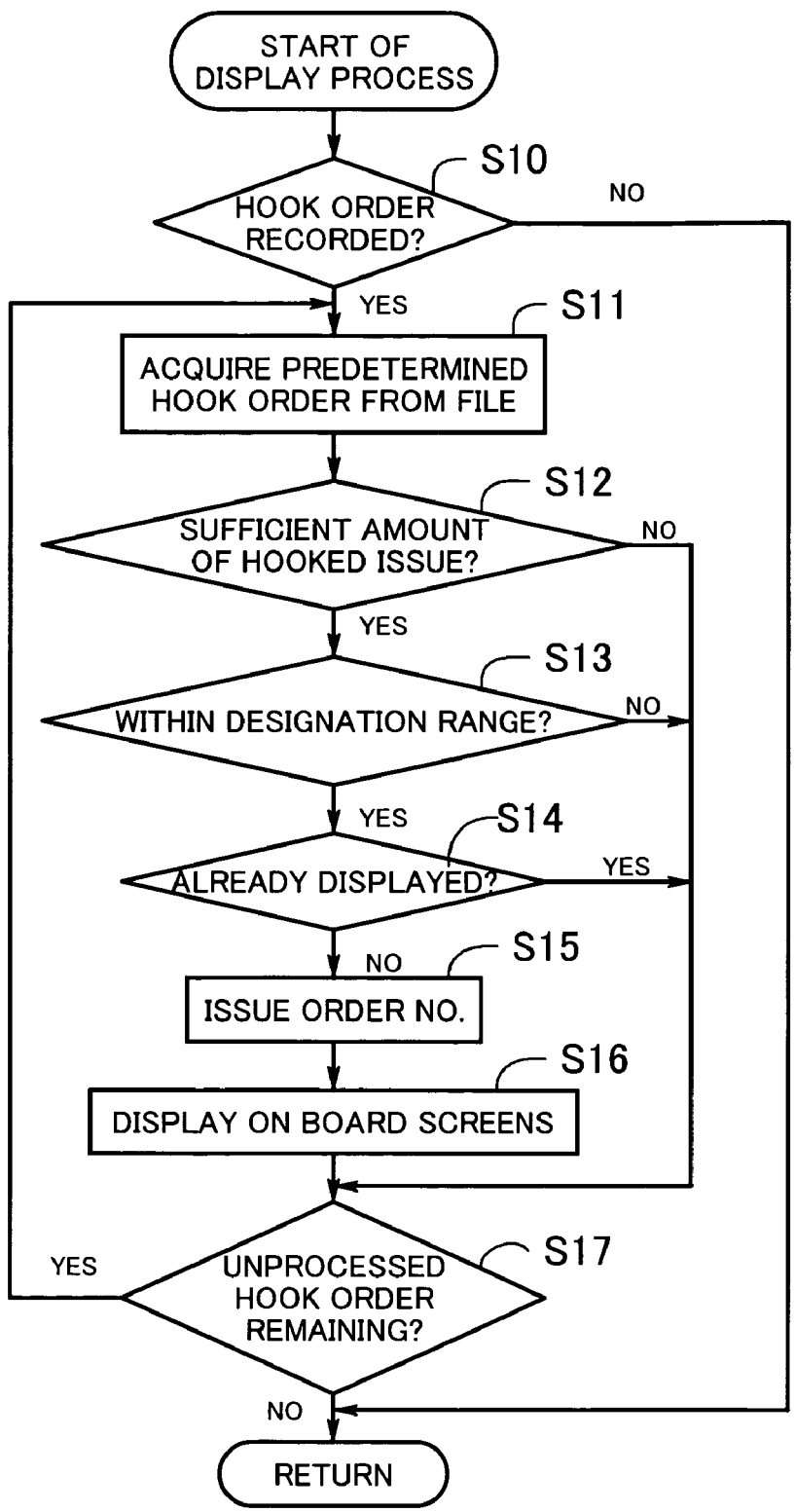
FIG. 7 is a flowchart illustrating details of a "DISPLAY PROCESS" shown in FIG. 6.

Referring now to FIG. 7, the "DISPLAY PROCESS" shown in FIG. 6 will be described in detail. Upon start of the process shown in the flowchart, the following steps are executed.

[S10] The CPU 1a determines whether or not a chain order is recorded in the reserved order file stored in the HDD 1d. If a chain order is recorded, the flow proceeds to Step S11; otherwise the flow returns to the original process (RETURN).

[S11] The CPU 1a acquires one predetermined chain order from the reserved order file.

[S12] The CPU 1a determines whether or not there remains the amount of the chained issue requested by the chain order acquired in Step S11, that is, whether or not there is a sufficient amount of the chained issue with the best rate. If there is a sufficient amount of the chained issue, the flow proceeds to Step S13; if not, the flow proceeds to Step S17.

[S13] The CPU 1a determines whether or not the rate of the best-rate chained issue falls within the designation range. If the rate is within the designation range, the flow proceeds to Step S14, and if not, the flow proceeds to Step S17.

[S14] The CPU 1a determines whether or not the chain order being processed is already displayed. If the chain order is already displayed, the flow proceeds to Step S17; if not, the flow proceeds to Step S15.

[S15] The CPU 1a issues an order number.

[S16] The CPU 1a causes the terminal unit 2 and the display units 3-1 to 3-n to display the chain order being processed on their board screen.

Usually, since chain order involves a sell/buy order (in this example, buy order) for chained goods, the sell/buy order is displayed also on the board screen associated with the chained goods. However, such a buy order is not displayed because it is not transacted singly.

[S17] The CPU 1a refers to the reserved order file to determine whether or not there is an unprocessed chain order. If an unprocessed chain order exists, the flow returns to Step S11 to repeat the same process as described above; if not, the flow returns to the original process (RETURN).

According to the above process, if a chain order is recorded in the reserved order file and if it fulfills the chain order display conditions (if there remains a sufficient amount of the chained issue, if the rate is within the designation range, and if the chain order is not displayed yet), the chain order is displayed on the board screens with an order number assigned thereto. If the chain order thereafter fails to satisfy the display conditions, it is deleted from the board screens in the "CANCELLATION PROCESS" or the "RATE FOLLOW-UP PROCESS" described below.

Figure 8:
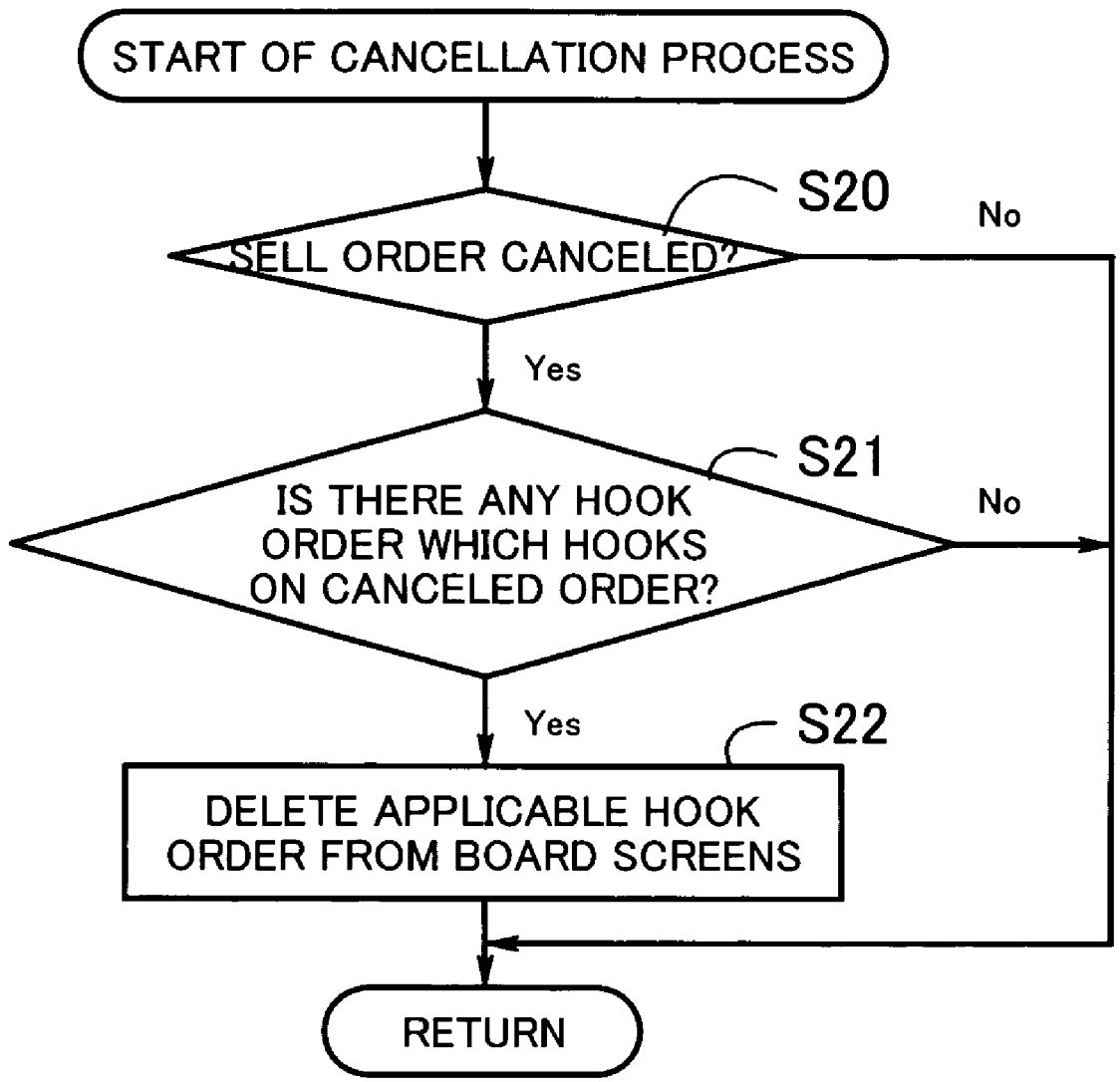
FIG. 8 is a flowchart illustrating details of a "CANCELLATION PROCESS" shown in FIG. 6.

Referring now to FIG. 8, the "CANCELLATION PROCESS" shown in FIG. 6 will be described in detail. When the process shown in the flowchart is started, the following steps are executed.

[S20] The CPU 1a determines whether or not a sell order has been canceled. If a sell order has been canceled, the flow proceeds to Step S21; otherwise the flow returns to the original process (RETURN).

[S21] The CPU 1a refers to the reserved order file to determine whether or not there is a chain order which chains on the canceled sell order. If such a chain order exists, the flow proceeds to Step S22, and if not, the flow returns to the original process (RETURN).

[S22] The CPU 1a deletes the applicable chain order from the board screens, and then resumes the original process (RETURN).

According to the above process, if a sell order is canceled and if a certain chain order chains on the sell order, the chain order is deleted from the board screens. Needless to say, the canceled sell order is also deleted from the board screens by another process, not shown.

Figure 9:
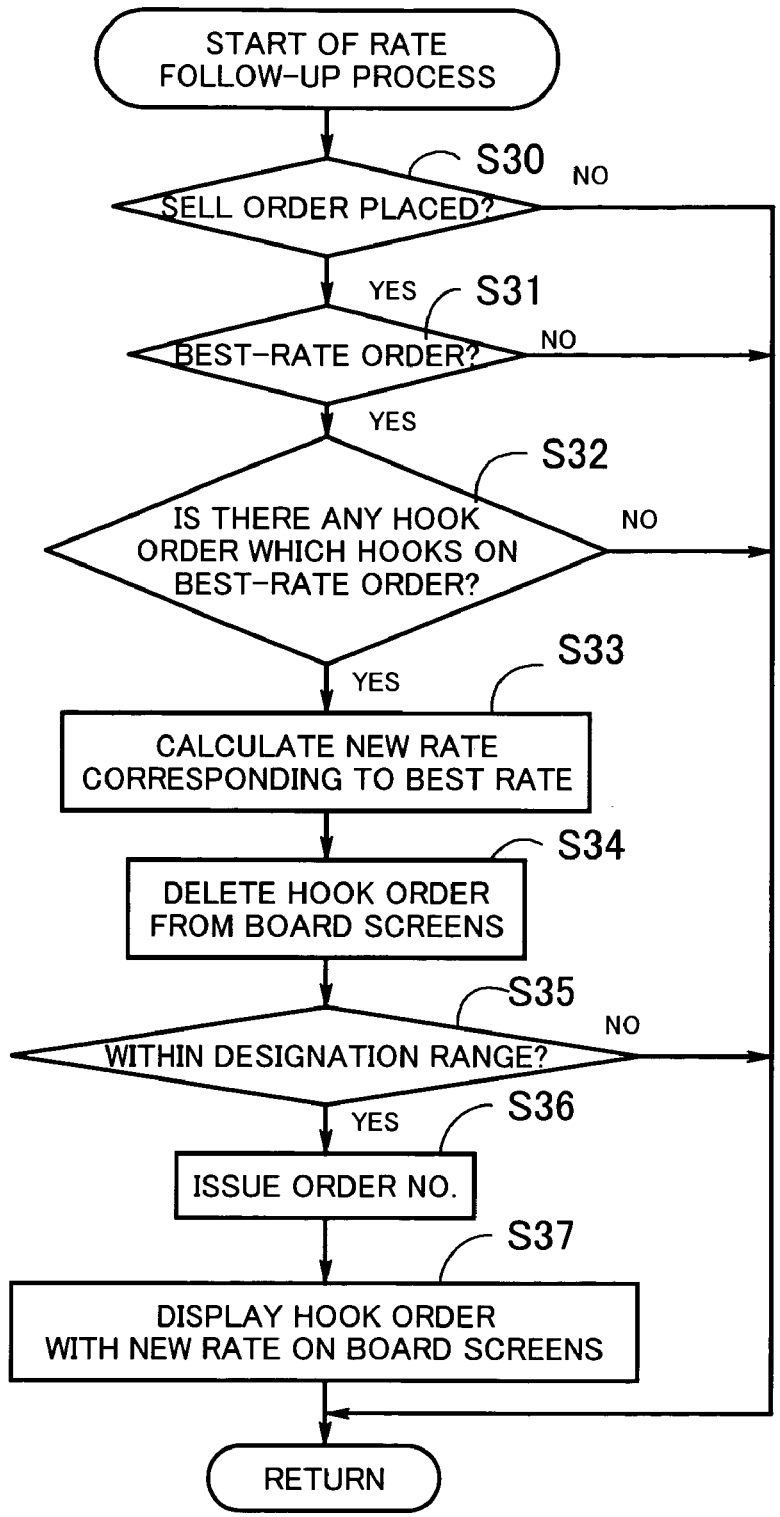
FIG. 9 is a flowchart illustrating details of a "RATE FOLLOW-UP PROCESS" shown in FIG. 6.

Referring now to FIG. 9, the "RATE FOLLOW-UP PROCESS" shown in FIG. 6 will be described in detail. Upon start of the process shown in the flowchart, the following steps are executed.

[S30] The CPU 1a determines whether or not a new sell order has been placed. If a sell order has been newly placed, the flow proceeds to Step S31; otherwise the flow returns to the original process (RETURN).

[S31] The CPU 1a determines whether or not the sell order is an order with the best rate (best-rate order). If the sell order is a best-rate order, the flow proceeds to Step S32; if not, the flow returns to the original process (RETURN).

[S32] The CPU 1a refers to the reserved order file to determine whether or not there exists a chain order which chains on the best-rate order. If such a chain order exists, the flow proceeds to Step S33; otherwise the flow returns to the original process (RETURN).

[S33] The CPU 1a calculates a new rate corresponding to the best rate. Specifically, the CPU 1a adds the rate specified when the chain order was placed (the rate shown in FIG. 2) to the rate of the chained issue whose rate has been judged to be highest (best rate) in Step S31, thereby calculating the rate of the chain issue.

[S34] The CPU 1a deletes the chain order in question from the board screens.

[S35] The CPU 1a looks up the designation range stored in the reserved order file, and determines whether or not the new rate falls within the designation range. If the new rate is within the designation range, the flow proceeds to Step S36; if not, the flow returns to the original process (RETURN).

[S36] The CPU 1a issues a new order number.

[S37] The CPU 1a displays, on the board screens, the chain order to which the new order number and the new rate have been assigned.

According to the above process, when the best rate of the chained issue has changed, the corresponding chain issue is deleted from the board screens, and the chain order is again displayed with a new order number and a new rate assigned thereto. Also, if the new rate does not fall within the designation range, the corresponding chain order is deleted from the board screens.

Lastly, referring to FIG. 10, details of the "CONTRACTING PROCESS" shown in FIG. 6 will be described. When the process shown in the flowchart is started, the following steps are executed.

[S40] The CPU 1a determines whether or not a buy order has been placed. If a buy order has been placed, the flow proceeds to Step S41; otherwise the flow returns to the original process (RETURN).

[S41] The CPU 1a refers to the reserved order file, and if the buy order placed is a buy order for a chain order, the flow proceeds to Step S42; otherwise the flow proceeds to Step S48.

[S42] The CPU 1a automatically conducts a deal with respect to the chain order concerned. Specifically, a selling process for the chain issue and a purchasing process for the chained issue are performed.

[S43] The CPU 1a deletes the corresponding chain order from the board screens.

[S44] The CPU 1a deletes the corresponding chain order from the reserved order file.

[S45] The CPU 1a deletes the corresponding chained order from the board screens. At this time, the CPU 1a temporarily displays, on the board screens, information indicating that a buy order for the chained goods has been conducted.

[S46] The CPU 1a deletes the corresponding chained order from the reserved order file.

In the case where the amount of the chained order is greater than that of the chain order, the remainder of the chained order is displayed with a new order number issued (for example, the number "1-2" is issued to indicate that the order is derived from the original order with the order number "1").

[S47] The CPU 1a determines whether or not the chained order is a chain order. If the chained order is a chain order, the flow returns to Step S42 to repeat the same process as described above; if not, the flow returns to the original process (RETURN).

Namely, in the case where chain orders are chained, the flow returns to Step S42 and the aforementioned process is repeated, so that a chain of chain orders can be coped with.

In order to avoid the process becoming too complicated, the process may be interrupted in the event more than a predetermined number of chain orders are chained.

[S48] The CPU 1a conducts an ordinary deal. Namely, since the buy order placed is not for a chain order and is an ordinary order (outright order), an ordinary process is carried out with respect to the outright order and the original process is resumed (RETURN).

According to the above process, if a buy order is placed and if the order placed is for a chain order (chain issue), a selling process for the chain issue and a purchasing process for the chained issue are automatically carried out, and the results of the deals conducted are reflected in the board screens.

As described above, according to the embodiment of the present invention, chain orders are automatically transacted, permitting reliable and speedy transactions.

In the event the best rate of the chained issue has changed, the rate of the chain issue is automatically varied so as to follow up the best rate, whereby the burden imposed on the agent can be mitigated.

Also, if the best rate of the chained issue changes to such an extent as to become outside the designation range or if a sell order for the chained issue is canceled, the chain order is deleted from the screens and the display of the chain order is suspended until the chain order again fulfills the display conditions thereafter. It is therefore possible to prevent a buy order from being placed by mistake.

In the foregoing description, only a chain order in which one purchases somebody else's goods on condition of sale of his/her bonds is explained, but the present invention is also applicable to a chain order in which one sells his/her goods on condition of purchase of somebody else's bonds.

Also, although the above description is given taking bonds as an example, goods to be transacted by the present invention are not limited to bonds alone and various other goods can of course be transacted.

Further, in the foregoing description, a buy order (or sell order) for chained goods is temporarily displayed on the board screens after a chain deal is conducted, but may be displayed from the first on the board screens while explicitly indicating that the goods are chained goods.

Figure 11:
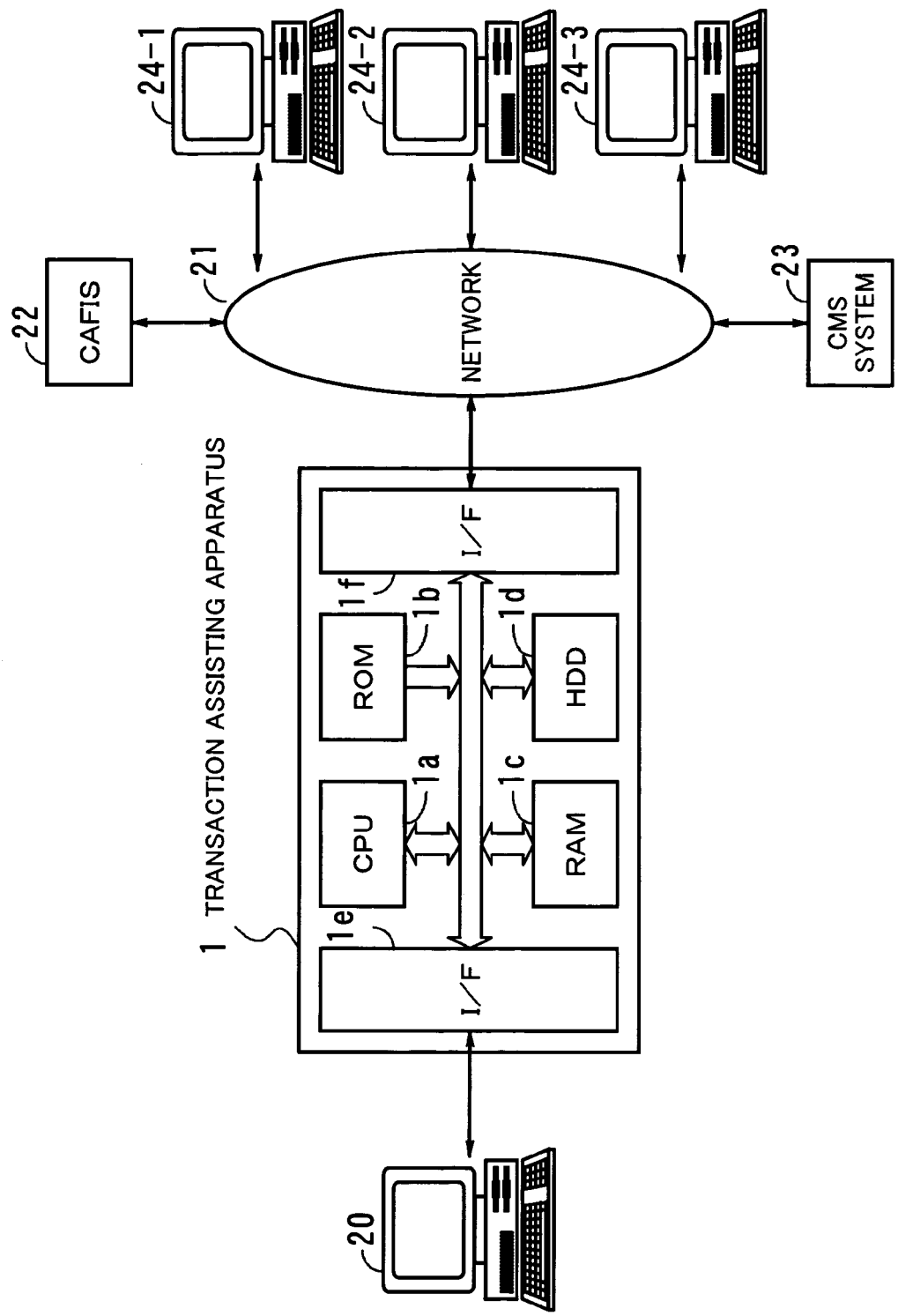
FIG. 11 is a block diagram exemplifying a configuration according to a second embodiment of the present invention.

Referring now to FIG. 11, a second embodiment of the present invention will be described. In the figure, identical reference numerals are used to denote identical elements appearing in FIG. 5 and description of such elements is omitted.

In this embodiment, goods to be dealt in are "used cars." Terminal units 20 and 24-1 to 24-3 each comprise a personal computer or the like. The terminal unit 20 is installed at broker's side while the terminal units 24-1 to 24-3 are installed at agencies' side.

A network 21 is, for example, a public network such as ISDN (Integrated Service Digital Network), and interconnects the transaction assisting apparatus 1 with the terminal units 24-1 to 24-3, etc. to permit transmission of information from one to another.

A CAFIS (Credit And Finance Information System; trademark) 22 takes charge of a process for relaying credit data to a credit card company when payment is made by a credit card or the like, and also provides services on behalf of a credit card company when the operation of the company's computer center is suspended.

A CMS (Cash Management Service) system 23 performs, among other processes, transfer of payment from one bank to another when payment is made from a bank account.

The other elements are identical with those appearing in FIG. 5.

The operation of the embodiment will be now described.

Figure 12:
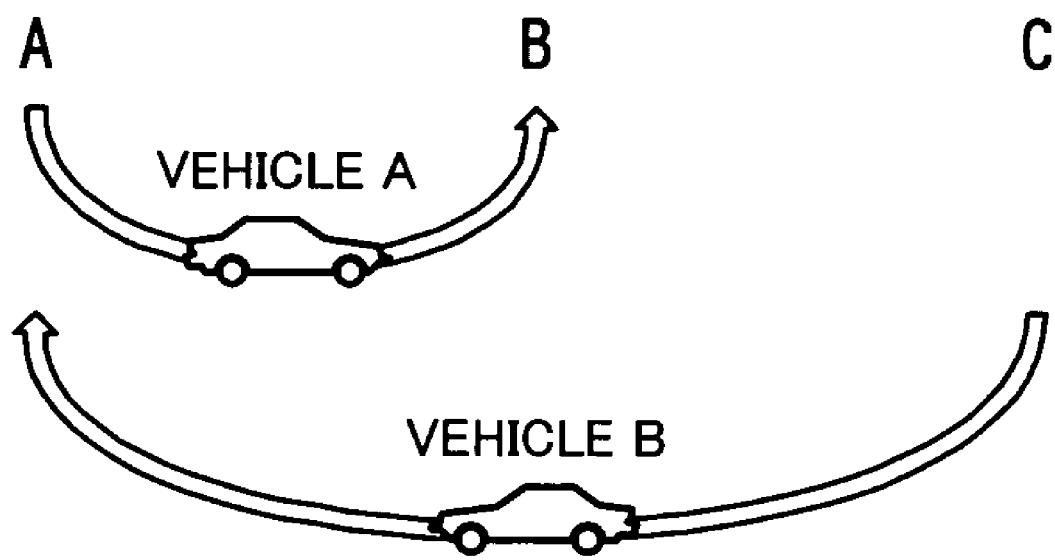
FIG. 12 is a diagram illustrating a vehicle replacement deal.

FIG. 12 illustrates a replacement order which is transacted in this embodiment. Replacement order is an order in which one requests, on condition of sale or purchase of certain goods, purchase or sale of other goods. In the example shown in FIG. 12, used cars are taken as an example of such goods and A denotes an orderer who placed a replacement order. B and C are a purchaser and a seller, respectively, involved in the replacement order. Specifically, the replacement order placed by A is an order wherein A requests, on condition of sale of his/her vehicle A or purchase of a vehicle B, purchase of the vehicle B or sale of his/her vehicle A. In the following, the scheme and process for appropriately transacting such a replacement order will be described.

Figure 13:
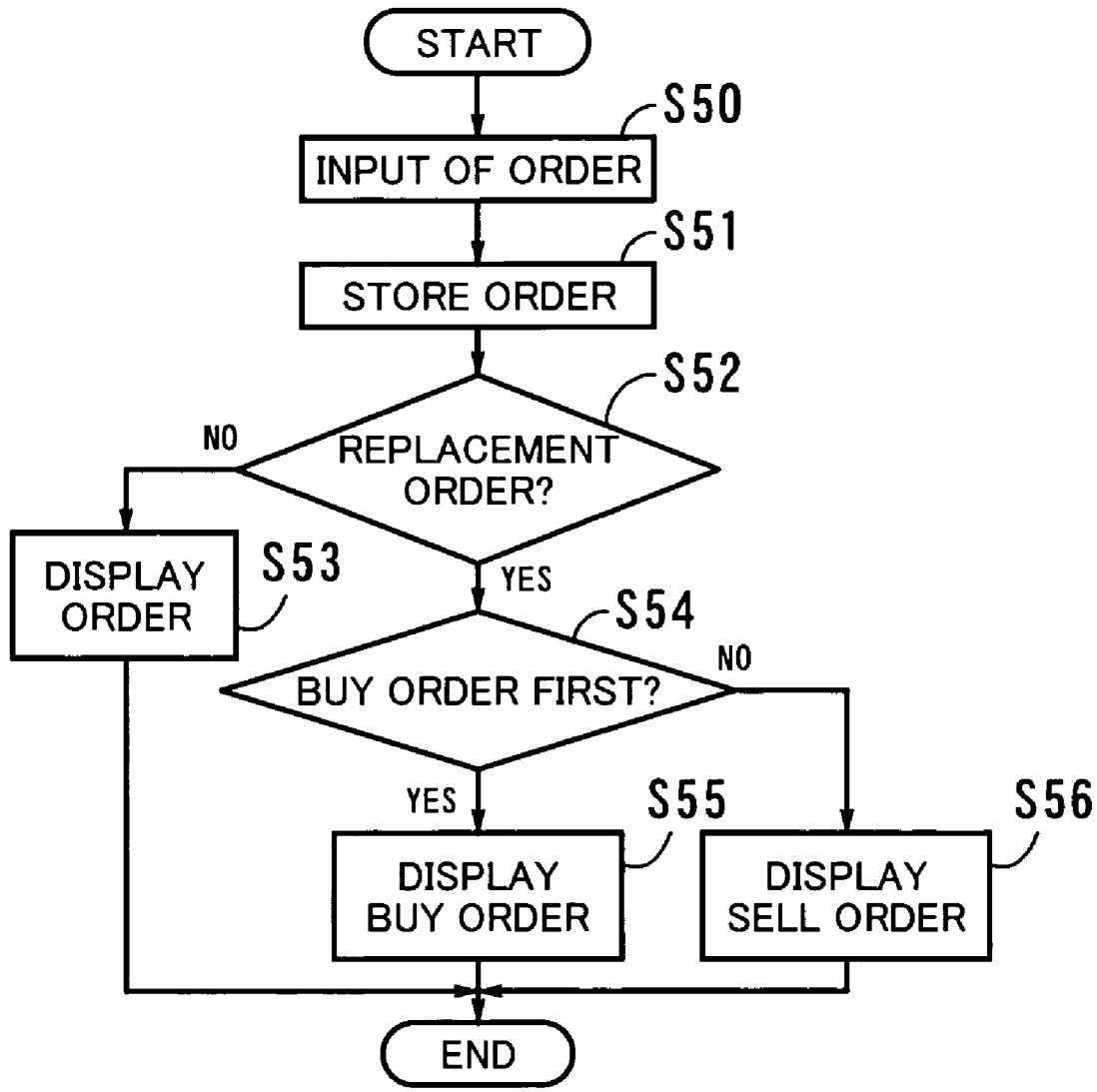
FIG. 13 is a flowchart showing an example of a process executed when an order is input in the embodiment shown in FIG. 11.

FIG. 13 is a flowchart showing an example of a process executed when a sell/buy order for a used car is input in the embodiment shown in FIG. 11. Upon start of the process shown in the flowchart, the following steps are executed.

[S50] The CPU 1a accepts input of orders (ordinary orders and replacement orders) from the terminal units 20 and 24-1 to 24-3 via the I/Fs 1e and 1f.

FIG. 14 shows an example of an order (in the illustrated example, a replacement order) input from a terminal unit. In the figure, "ORDER NO." is a serial number uniquely assigned to each order, and "BODY NO." is a number specifying a vehicle model. "MODEL YEAR" indicates the year in which the vehicle was produced, and "COLOR" indicates the color of the vehicle body. "DISTANCE" indicates the distance traveled by the vehicle. "FIRST REGISTRATION DATE" indicates the date on which the vehicle was purchased, and "LAST REGISTRATION DATE" indicates the date of the last vehicle inspection. "LAST REGISTRATION NO." indicates the vehicle number assigned to the vehicle at the time of the last registration, and "PRICE DESIRED" indicates a desired selling price of the vehicle. "DEAL" indicates the type of deal and, in the illustrated example, "REPLACEMENT" is shown to the right of "DEAL", specifying that the order concerned is a replacement order. A summary of a replacement vehicle is shown in the right-hand columns including the items "BODY NO." to "PRICE". Specifically, the replacement vehicle should be as follows: body number: "111845"; model year: "89"; color: "WHITE"; distance traveled: "80,000 km"; and price: "900,000" yen.

"PRIORITY" indicates which of buy order and sell order should be given priority. Namely, if buy order is to be given priority, a procedure for selling the vehicle is taken after the purchase of a desired vehicle. Conversely, if sell order is to be given priority, a procedure for purchasing a desired vehicle is taken after the sale of the vehicle.

"BANK NO." through "ACCOUNT HOLDER'S PHONE NO." show information about a bank account from which payment is to be transferred when the deal is conducted.

In the above example, payment is made from a bank account, but may alternatively be made by a credit card. FIG. 15 shows an example of an order wherein payment is to be made by a credit card. In this example, "CARD NO." through "CARDHOLDER'S PHONE NO." show information necessary for the payment by a credit card.

In the case where the order placed is an ordinary order and not a replacement order, "ORDINARY" is entered as the type of "DEAL" and the order form is formatted such that information about a replacement vehicle ("PRIORITY" through "PRICE") is omitted.

[S51] The CPU 1a stores the input order in a predetermined area of the HDD 1d.

[S52] The CPU 1a determines whether or not the input order is a replacement order. If the input order is a replacement order, the flow proceeds to Step S54, and if not, the flow proceeds to Step S53.

[S53] The CPU 1*a* supplies the input order to the terminal units 20 and 24-1 to 24-3 via the I/Fs 1*e* and 1*f* to be displayed on their screen.

FIG. 16 shows an example of a screen displayed at the terminal units 20 and 24-1 to 24-3. In this example, the order numbers "010001" through "010003" correspond to ordinary orders (not replacement orders). The contents of display appearing on the screen correspond to the individual items of orders input through the terminal units. In the figure, "SELL/BUY" indicates whether the order concerned is a sell order or a buy order.

[S54] The CPU 1*a* determines whether or not the replacement order specifies buy order to be given priority. If buy order is to be given priority, the flow proceeds to Step S55; if not, the flow proceeds to Step S56.

In the example shown in FIG. 14, for example, "BUY" is shown to the right of "PRIORITY". It is therefore judged that buy order is to be given priority, and the flow proceeds to Step S55.

[S55] The CPU 1*a* extracts a buy order from the replacement order, and supplies the buy order to the terminal units 20 and 24-1 to 24-3 to be displayed on their screen.

In FIG. 16, the buy order extracted from the replacement order shown in FIG. 14 is displayed at the lowermost row. Namely, the items appearing in the right-hand column of the "DEAL" section in FIG. 14 are shown in the row. The underscore of "010004" as the "ORDER NO." indicates that the order concerned is a replacement order.

[S56] The CPU 1*a* extracts a sell order from the replacement order, and supplies the sell order to the terminal units 20 and 24-1 to 24-3 to be displayed on their screen.

According to the process described above, orders input from the terminal units are stored in the HDD 1*d* shown in FIG. 11 and are also displayed at the individual terminal units as a screen as shown in FIG. 16, for example.

Figure 17:
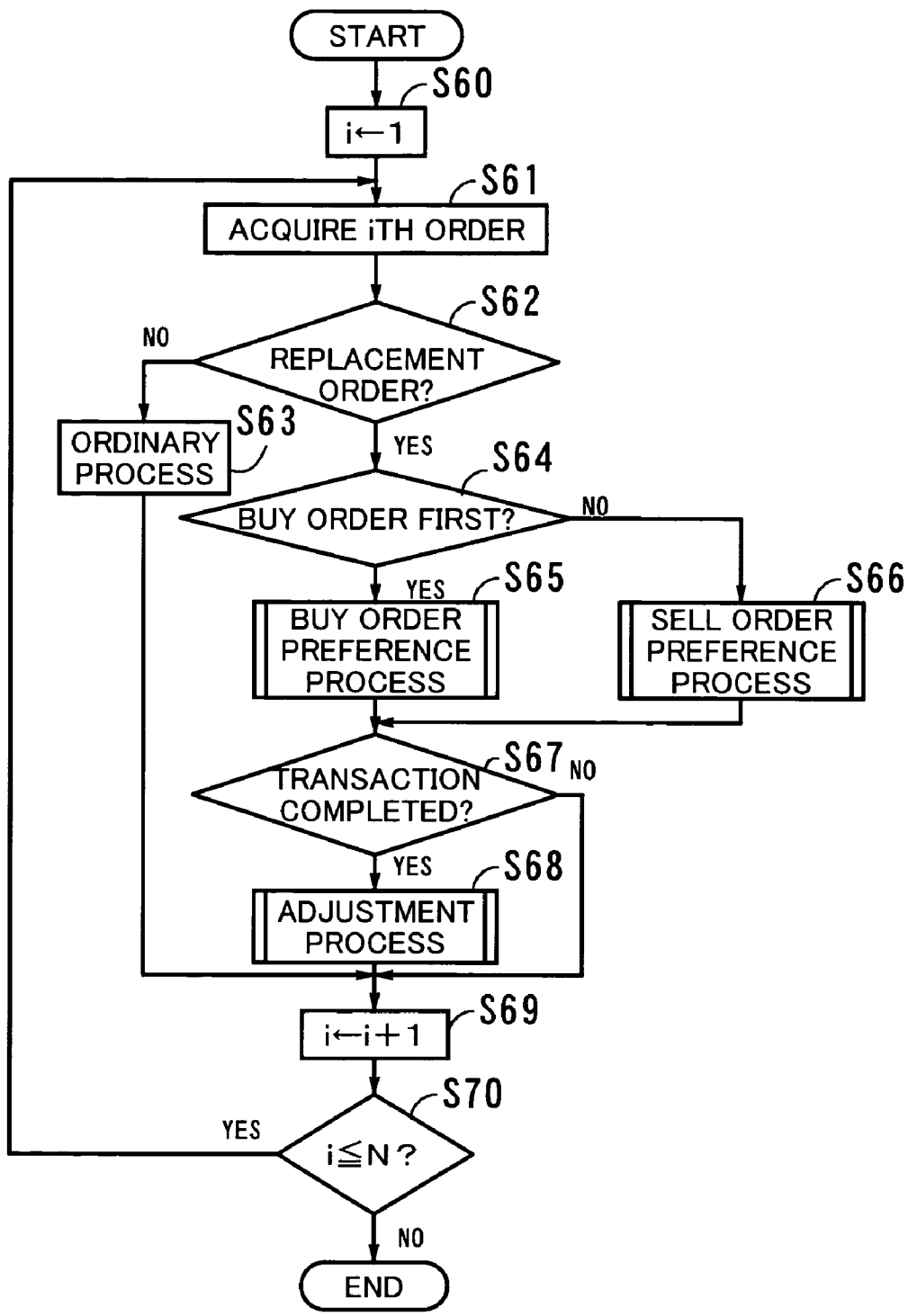
FIG. 17 is a flowchart showing an example of a process executed when an input order is processed in the embodiment shown in FIG. 11.

Referring now to the flowchart of FIG. 17, a process executed by the transaction assisting apparatus 1 shown in FIG. 11 when a stored order is transacted will be described. The process shown in the flowchart is executed at predetermined intervals as an interruption process, for example, to transact orders stored in the HDD 1*d*. Upon start of the process shown in the flowchart, the following steps are executed.

[S60] The CPU 1*a* sets a variable i for counting the number of times the process is executed, to an initial value of "1".

[S61] The CPU 1*a* searches the orders stored in the HDD 1*d* to acquire an ith order.

[S62] The CPU 1*a* determines whether or not the acquired order is a replacement order. If the acquired order is a replacement order, the flow proceeds to Step S64, and if not, the flow proceeds to Step S63.

[S63] The CPU 1*a* executes an ordinary process with respect to an ordinary order.

The ordinary process means a process wherein a buy or sell order that fulfills the conditions of the acquired sell or buy order, if any, is reserved and the payment is adjusted.

[S64] The CPU 1*a* determines whether or not the replacement order specifies buy order to be given priority. If buy order is to be given priority, the flow proceeds to Step S65; if not, the flow proceeds to Step S66.

[S65] The CPU 1*a* executes a "BUY ORDER PREFERENCE PROCESS" wherein, if a sell order is placed for the buy order, such a sell order is reserved and then the sell order of the replacement order is conducted.

Details of the process will be described later with reference to FIG. 18.

[S66] The CPU 1*a* executes a "SELL ORDER PREFERENCE PROCESS" wherein, if a buy order is placed for the sell order, such a buy order is reserved and then the buy order of the replacement order is conducted.

Details of the process will be described later with reference to FIG. 19.

[S67] The CPU 1*a* determines whether or not the transaction of the replacement order has been completed. If the transaction has been completed, the flow proceeds to Step S68; if not, the flow proceeds to Step S69.

[S68] The CPU 1*a* executes an "ADJUSTMENT PROCESS" wherein payments due arising from the transaction and taxes accompanying the transaction are calculated and money is collected from or transferred to the bank accounts etc. of the parties involved in the transaction.

Details of the process will be described later with reference to FIG. 21.

[S69] The CPU 1*a* increments the value of the variable by "1".

[S70] If the value of the variable i is smaller than or equal to a total number N of orders then stored in the HDD 1*d*, the CPU 1*a* reverts to Step S61 to repeat the same process as described above; otherwise the process is ended.

Figure 18:
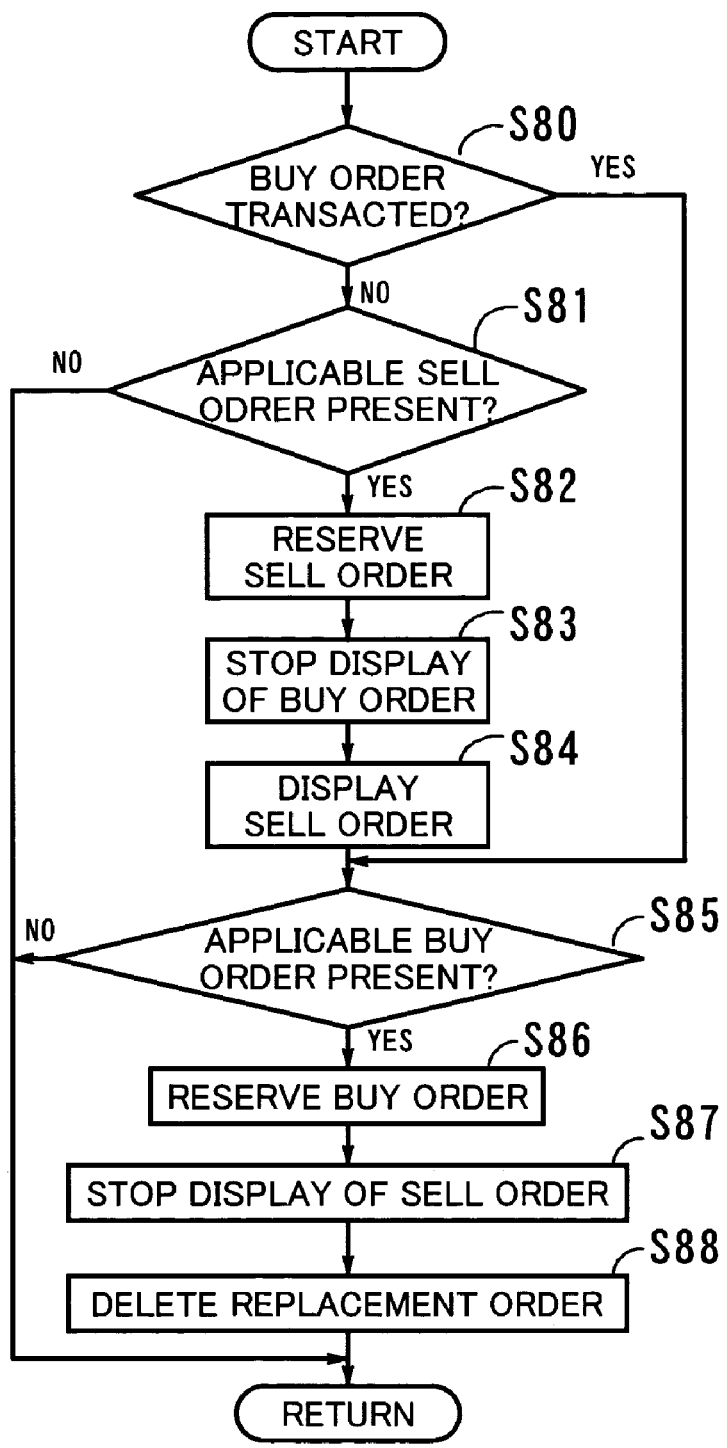
FIG. 18 is flowchart illustrating in detail a "BUY ORDER PREFERENCE PROCESS" shown in FIG. 17.

Referring now to FIG. 18, the "BUY ORDER PREFERENCE PROCESS" shown in FIG. 17 will be described in detail. Upon start of the process shown in the flowchart, the following steps are executed.

[S80] The CPU 1*a* determines whether or not the buy order has been transacted. If the buy order has already been transacted, the flow proceeds to Step S85; if not, the flow proceeds to Step S81.

Namely, Step S85 is executed if a sell order was placed for the buy order and the deal of the buy order has already been completed, or more specifically, if, in FIG. 12, only a contract for purchase of C's vehicle B by A has been concluded.

[S81] The CPU 1*a* searches the HDD 1*d* to determine whether or not there is a sell order fulfilling the conditions of the buy order. If, as a result of the determination, there exists an applicable sell order, the flow proceeds to Step S82; if not, the flow returns to the original process.

[S82] The CPU 1*a* reserves the applicable sell order.

For example, if there exists a sell order satisfying the conditions of the buy order with the order number "010004" shown in FIG. 16, such a sell order is reserved.

[S83] The CPU 1*a* stops displaying the corresponding buy order.

For example, in the example shown in FIG. 16, the buy order with the order number "010004" disappears from the screens of the individual terminal units.

[S84] The CPU 1*a* causes the individual terminal units to display the sell order of the replacement order.

In the example shown in FIG. 14, for example, information about the orderer's vehicle (vehicle with the body number "554845"), which is a target of the sell order, is supplied to the individual terminal units to be displayed thereat. FIG. 20 shows an example of a screen which is displayed at the individual terminal units as a result of execution of this step. In the illustrated example, a sell order with the order number "010004" is shown, specifying the vehicle with the body number "554845".

[S85] The CPU 1*a* determines whether or not a buy order satisfying the conditions of the sell order is stored in the HDD 1*d*. If such a buy order exists, the flow proceeds to Step S86; if not, the flow returns to the original process.

For example, if there exists a buy order fulfilling the conditions of the sell order with the order number "010004" shown in FIG. 20, the flow proceeds to Step S86.

[S86] The CPU 1*a* reserves the buy order.

[S87] The CPU 1a causes the individual terminal units to stop displaying the sell order of the replacement order.

In the example shown in FIG. 20, for example, the sell order with the order number "010004" disappears from the screens.

[S88] The CPU 1a deletes the replacement order from the HDD 1d.

According to the above process, transactions can be carried out in a manner such that the buy order of a replacement order is conducted preferentially over the sell order of same.

Figure 19:
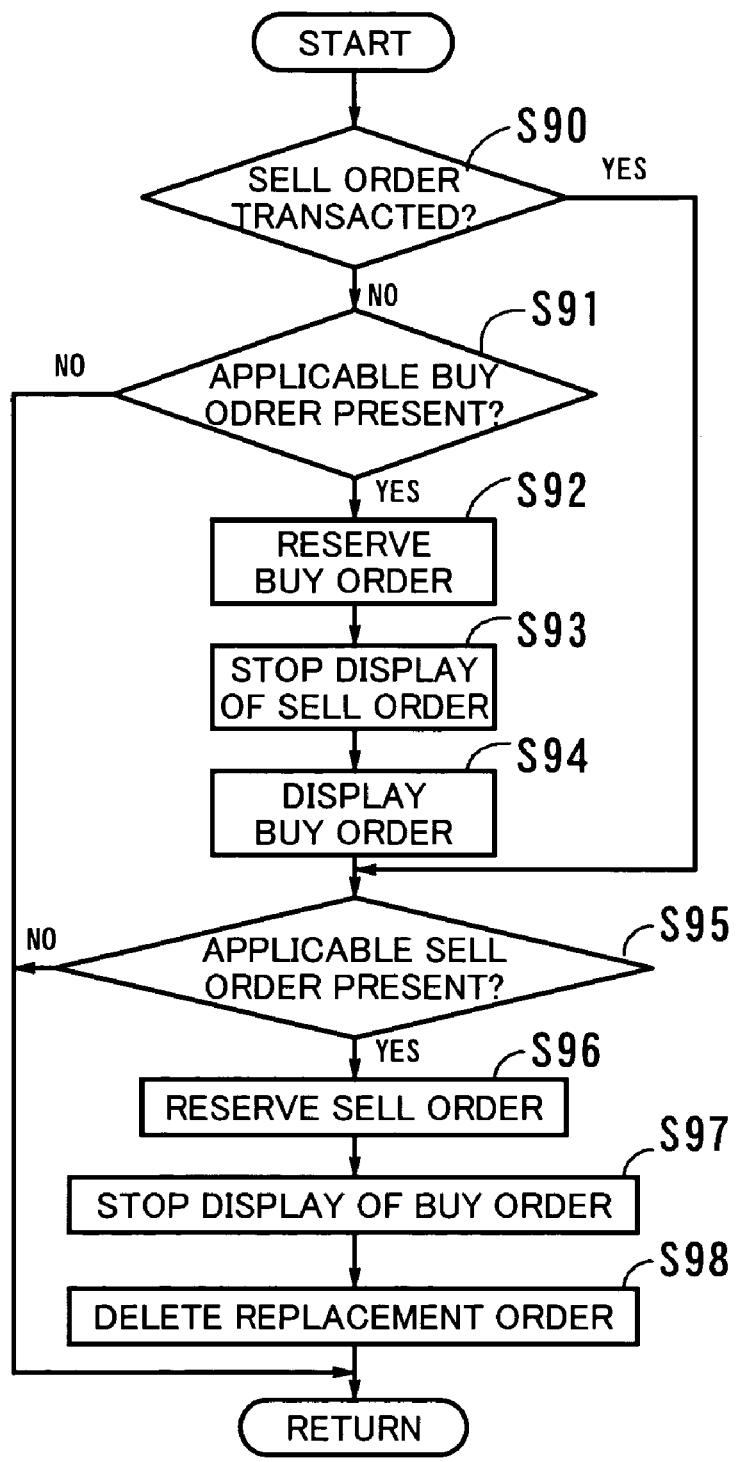
FIG. 19 is flowchart illustrating in detail a "SELL ORDER PREFERENCE PROCESS" shown in FIG. 17.

Referring now to FIG. 19, the "SELL ORDER PREFERENCE PROCESS" shown in FIG. 17 will be described in detail. Upon start of the process shown in the flowchart, the following steps are executed.

[S90] The CPU 1a determines whether or not the sell order has been transacted. If the sell order has already been transacted, the flow proceeds to Step S95; if not, the flow proceeds to Step S91.

Namely, Step S95 is executed if a buy order was placed for the sell order and the deal of the sell order has already been completed, or more specifically, if, in FIG. 12, only a contract for purchase of A's vehicle A by B has been concluded.

[S91] The CPU 1a searches the HDD 1d to determine whether or not there is a buy order fulfilling the conditions of the sell order. If, as a result of the determination, there exists an applicable buy order, the flow proceeds to Step S92; if not, the flow returns to the original process.

[S92] The CPU 1a reserves the applicable buy order.

[S93] The CPU 1a stops displaying the corresponding sell order.

[S94] The CPU 1a causes the individual terminal units to display the buy order of the replacement order.

[S95] The CPU 1a determines whether or not a sell order satisfying the conditions of the buy order is stored in the HDD 1d. If such a sell order exists, the flow proceeds to Step S96; if not, the flow returns to the original process.

[S96] The CPU 1a reserves the sell order.

[S97] The CPU 1a causes the individual terminal units to stop displaying the buy order of the replacement order.

[S98] The CPU 1a deletes the replacement order from the HDD 1d.

According to the above process, transactions can be carried out in a manner such that the sell order of a replacement order is conducted preferentially over the buy order of same.

Figure 21:
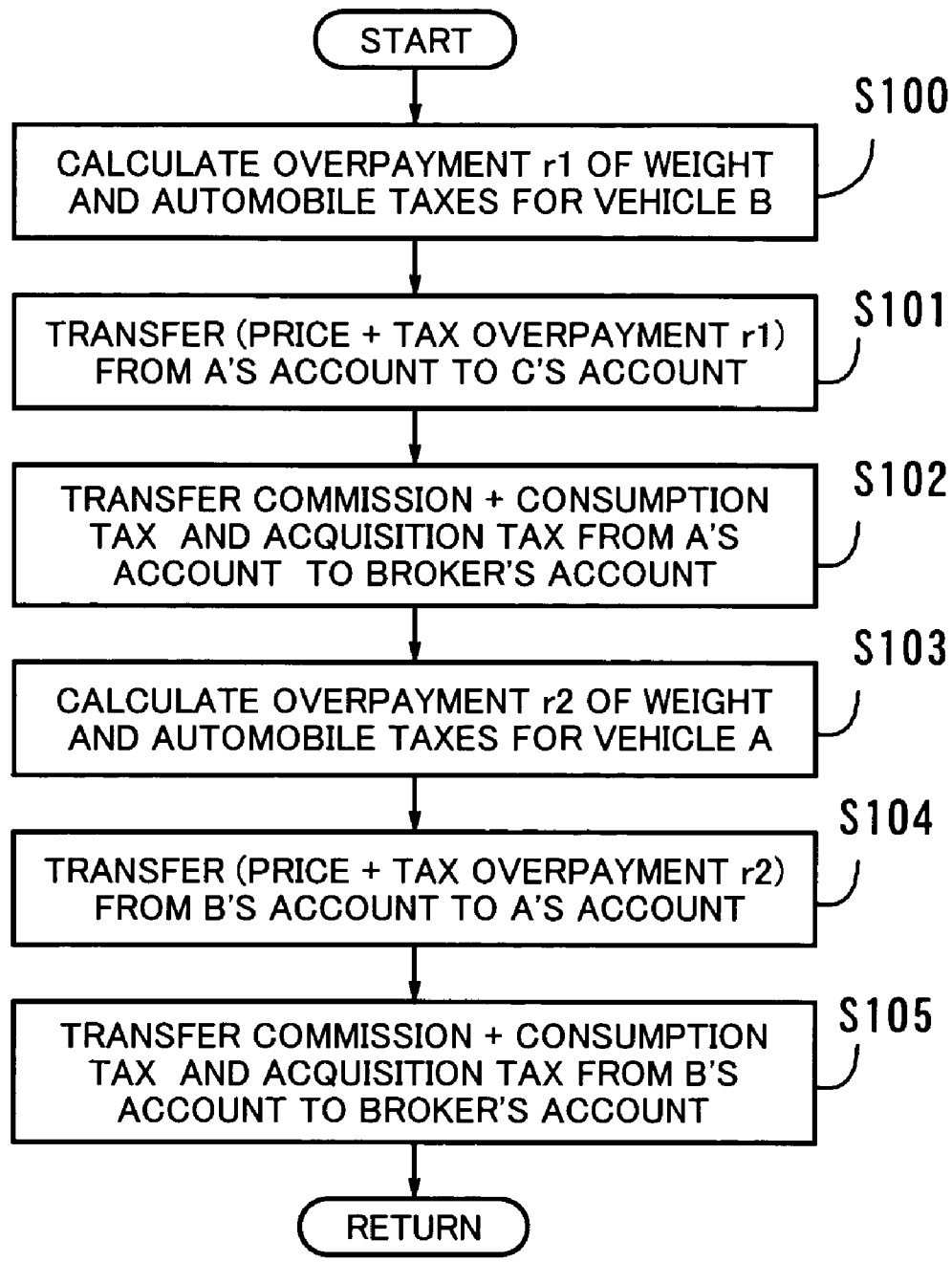
FIG. 21 is a flowchart illustrating an example of an "ADJUSTMENT PROCESS" shown in FIG. 17.
Figure 22:
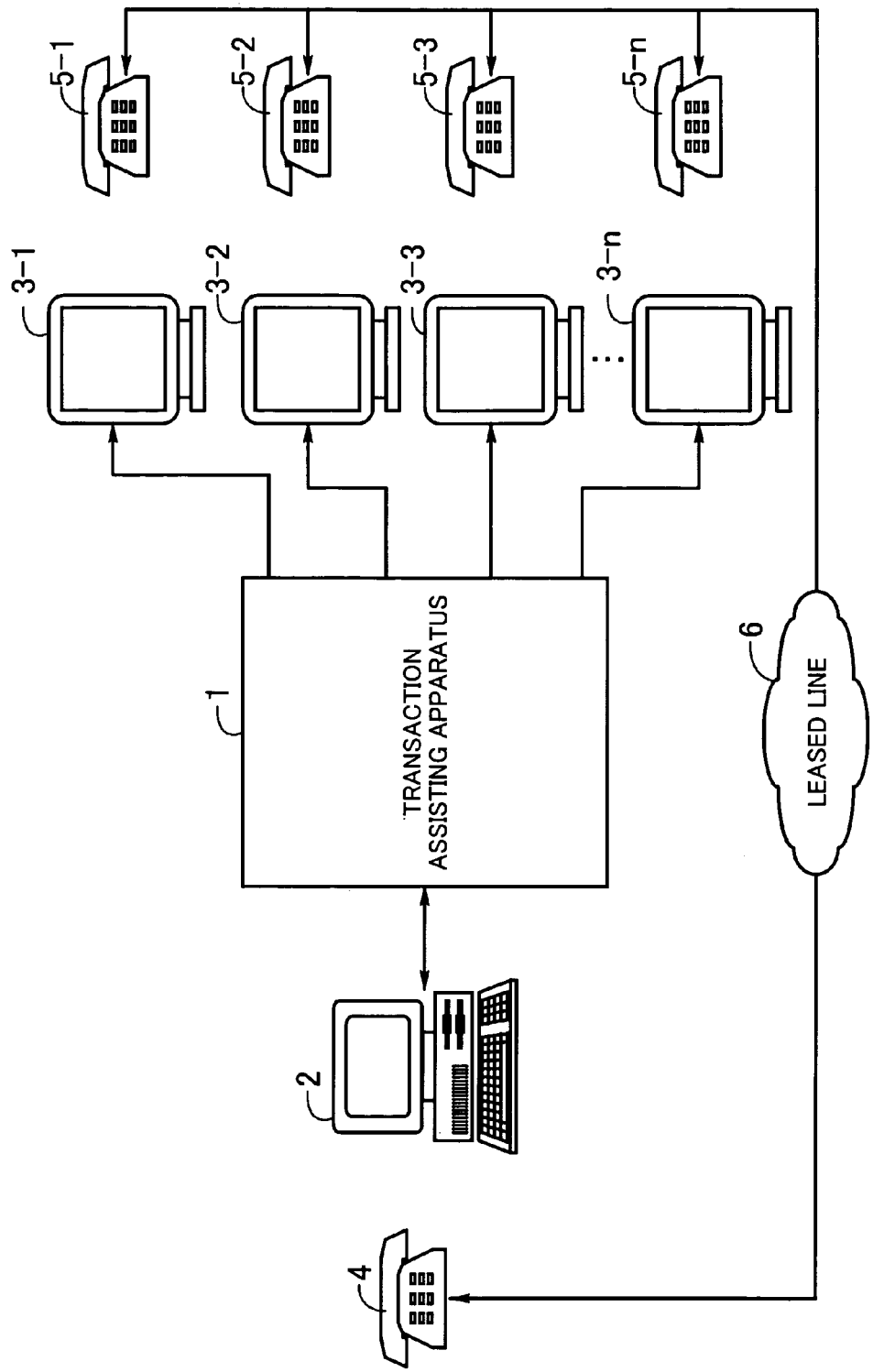
FIG. 22 is a diagram exemplifying a configuration of a conventional transaction assisting system.

Referring now to FIG. 21, details of the "ADJUSTMENT PROCESS" shown in FIG. 17 will be described. Upon start of the process shown in the flowchart, the steps stated below are executed. In the following description, the deals shown in FIG. 12 are taken as an example.

[S100] The CPU 1a calculates an overpayment r1 of weight and automobile taxes with respect to the vehicle B which A purchased from C.

Namely, weight tax and automobile tax are collected according to a system wherein the amount required until the next vehicle inspection must be paid in advance, and accordingly, if the title to the vehicle changes as a result of the transfer of the ownership from C to A, then it means that C has overpaid the taxes for an amount taxable after the date of transfer of the title. The amount thus borne in advance is therefore calculated as the tax overpayment r1.

[S101] The CPU 1a notifies the CMS system 23 of the sum of the price of the vehicle B and the tax overpayment r1, to have the sum transferred from A's account to C's account.

[S102] The CPU 1a causes the CMS system 23 to transfer the sum of the broker's commission plus consumption tax and an acquisition tax imposed on A for the acquisition of the vehicle from A's bank account to the broker's bank account.

The acquisition tax is calculated based on a price obtained by applying depreciation to new car's price.

[S103] The CPU 1a calculates an overpayment r2 of weight and automobile taxes with respect to the vehicle A which B purchased from A.

[S104] The CPU 1a notifies the CMS system 23 of the sum of the price of the vehicle A and the tax overpayment r2, to have the sum transferred from B's account to A's account.

[S105] The CPU 1a causes the CMS system to transfer the sum of the broker's commission plus consumption tax and an acquisition tax from B's account to the broker's account.

According to the above process, taxes and prices are automatically calculated and also are automatically transferred from one bank account to another, whereby broker's procedures can be expedited and taxes accompanying transactions can be automatically calculated and collected.

As described above, the second embodiment of the present invention permits reliable and speedy transactions of replacement orders in cases where goods such as automobiles are traded, for example. Further, taxes accompanying transactions can be accurately calculated and collected from the right person who has to pay the taxes, so that the burden imposed on the broker can be mitigated.

In the above embodiment, used cars are taken as an example of goods to be dealt in, but the goods to be dealt in may be real estate or other goods, for example.

Further, instead of collecting the price and the taxes from a bank account, the payment of the price and taxes may be settled by a credit card, for example. Such payment can be made by use of the CAFIS 22 shown in FIG. 11.

Lastly, the processing function described above can be performed by a computer. In this case, the contents of the process for performing the functions as the transaction assisting apparatus may be described in a program recorded on a computer-readable recording medium. The program is executed by a computer, whereupon the above-described process is performed by the computer. The computer-readable recording medium includes a magnetic recording device, a semiconductor memory, etc.

To bring the program to market, the program may be stored in portable recording media, such as CD-ROM (Compact Disk Read Only Memory) or floppy disk, to be distributed, or the program may be stored in a storage device of a computer connected to a network so that it can be transferred to other computers through the network. The program may be stored in a hard disk unit or the like of a computer, and when it is to be executed by the computer, the program is loaded into the main memory and executed.

As described above, according to the present invention, a transaction assisting apparatus for assisting transactions in goods comprises chain order input means permitting input of a chain order, the chain order being an order requesting, on condition of sale or purchase of first goods, purchase or sale of second goods different from the first goods, order detecting means for detecting an order for purchase or sale of the first goods with respect to which the chain order is placed, and chain order processing means, responsive to the detection of a buy or sell order with respect to a predetermined chain order by the order detecting means, for performing a selling or purchasing process with respect to the first goods and performing a purchasing or selling process with respect to the second goods. Accordingly, chain deals can be transacted reliably and speedily, and the burden imposed on the agent etc. can be mitigated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transaction assisting apparatus for assisting transactions in goods, comprising:
    a chain order input unit permitting input of a chain order, the chain order being an order requesting, on condition of sale or purchase of first movable goods by customer A, purchase or sale of second movable goods different from the first movable goods by customer B;
    an order detecting unit detecting an order for purchase or sale of the first movable goods with respect to which the chain order is placed; and
    a chain order processing unit responsive to the detection of a buy or sell order with respect to a predetermined chain order by said order detecting unit, for performing a selling or purchasing process with respect to the first movable goods by said customer A and performing a purchasing or selling process with respect to the second movable goods by said customer B;
    further comprising price changing means for, responsive to a change in price of the second movable goods, automatically changing a price of the corresponding first movable goods of the chain order in an interlocked manner.

2. The transaction assisting apparatus according to claim 1, further comprising:
    chain order storing means for storing the chain order input from said chain order input unit; and
    deleting means for deleting, from said chain order storing means, the chain order with respect to which the sale or purchase has been completed by said chain order processing unit.

3. The transaction assisting apparatus according to claim 1, further comprising display means for selectively displaying those of the chain orders which include a sell or buy order for the second movable goods and which satisfy a condition for sale or purchase of the second movable goods.

4. The transaction assisting apparatus according to claim 3, wherein said display means inhibits display of information about a buy or sell order for the second movable goods included in the chain order when the chain order is placed, and displays the information after the chain order is executed.

5. The transaction assisting apparatus according to claim 1, wherein said chain order processing unit performs chain order processing in series if an order placed with respect to the second movable goods to be transacted is a chain order.

6. The transaction assisting apparatus according to claim 1, further comprising tax amount calculating means for calculating an amount of tax to be paid as a result of the execution of the chain order; and
    notifying means for notifying parties concerned in the execution of the chain order of the amount of tax calculated by said tax amount calculating means.

7. The transaction assisting apparatus according to claim 1, further comprising transfer means for automatically transferring a price and a tax payable as a result of the execution from one to another of accounts of parties concerned in the execution.

8. A computer-readable recording medium recording a program to be executed by a computer for causing the computer to perform a transaction assisting process for assisting transactions in goods,
    wherein the program causes the computer to function as:
    permitting input of a chain order, the chain order being an order requesting, on condition of sale or purchase of first movable goods by customer A, purchase or sale of second movable goods different from the first movable goods by customer B;
    detecting an order for purchase or sale of the first movable goods with respect to which the chain order is placed; and
    responding to the detection of a buy or sell order with respect to a predetermined chain order by performing a selling or purchasing process with respect to the first movable goods by said customer A and performing a purchasing or selling process with respect to the second movable goods by said customer B;
    further comprising, responsive to a change in price of the second movable goods, automatically changing a price of the corresponding first movable goods of the chain order in an interlocked manner.

9. A method for assisting transactions in goods, the method comprising:
    permitting input of a chain order, the chain order being an order requesting, on condition of sale or purchase of first movable goods by customer A, purchase or sale of second movable goods different from the first movable goods by customer B;
    detecting, an order for purchase or sale of the first movable goods with respect to which the chain order is placed; and
    responding to the detection of a buy or sell order with respect to a predetermined chain order by performing a selling or purchasing process with respect to the first movable goods by said customer A and performing a purchasing or selling process with respect to the second movable goods by said customer B;
    further comprising, responsive to a change in price of the second movable goods, automatically changing a price of the corresponding first movable goods of the chain order in an interlocked manner.

10. A method according to claim 9, further comprising:
    storing the inputted chain order; and
    deleting the stored chain order with respect to which the sale or purchase has been completed.

11. A method according to claim 9, further comprising displaying those of the chain orders which include a sell or buy order for the second movable goods and which satisfy a condition for sale or purchase of the second movable goods.

12. A method according to claim 11, further comprising inhibiting display of information about a buy or sell order for the second movable goods included in the chain order when the chain order is placed, and displaying the information after the chain order is executed.

13. A method according to claim 11, further comprising, responsive to a change in price of the first movable goods, automatically changing a price of the corresponding second movable goods of the chain order in an interlocked manner.

14. A method according to claim 9, further comprising performing chain order processing in series if an order placed with respect to the second movable goods to be transacted is a chain order.

15. A method according to claim 9, further comprising calculating an amount of tax to be paid as a result of the execution of the chain order; and
    notifying parties concerned in the execution of the chain order of the amount of tax calculated.

16. A method according to claim 9, further comprising automatically transferring a price and a tax payable as a result of the execution from one to another of accounts of parties concerned in the execution.

17. An apparatus for assisting transactions in goods, comprising:
- a chain order input unit permitting input of orders to sell first movable goods to a second party in the electronic market, and permitting the input of a chain order, the chain order being an order requesting, on condition of execution of an order for sale of the first movable goods by customer A, purchase of second movable goods by customer B from a third party, the second movable goods being different from the first movable goods;
- an order detecting unit automatically detecting said sale of the first movable goods with respect to which the chain order has been placed by said customer A; and
- a chain order processor, responsive to the detection of said sell order for the first movable goods by said order detecting unit, automatically executing the chain order by purchasing the second movable goods by said customer B;
- further comprising a price changer for, responsive to a change in price of the second movable goods, automatically changing a price of the corresponding first movable goods of the chain order in an interlocked manner.

18. A transaction assisting apparatus for assisting transactions in goods, comprising:
- means for permitting input of a chain order, the chain order being an order requesting, on condition of sale or purchase of first movable goods by customer A, purchase or sale of second movable goods different from the first movable goods by customer B;
- means for detecting an order for purchase or sale of the first movable goods with respect to which the chain order is placed; and
- means for responding to the detection of a buy or sell order with respect to a predetermined chain order by performing a selling or purchasing process with respect to the first movable goods by said customer A and performing a purchasing or selling process with respect to the second movable goods by said customer B;
- further comprising price changing means for, responsive to a change in price of the second movable goods, automatically changing a price of the corresponding first movable goods of the chain order in an interlocked manner.

* * * * *